United States Patent [19]

Ugland et al.

[11] Patent Number: 5,581,548
[45] Date of Patent: Dec. 3, 1996

[54] FREQUENCY AND CHANNEL HOPPING COMMUNICATION IN A TDMA CELLULAR MOBILE RADIO SYSTEM

[75] Inventors: Jon K. Ugland, Sundbyberg; Perols B. O. Gudmundson, Sollentuna; Johan Skold, Akersberga, all of Sweden

[73] Assignee: Telefonaktiebolaget LM Ericsson, Stockholm, Sweden

[21] Appl. No.: 358,685

[22] Filed: Dec. 19, 1994

Related U.S. Application Data

[63] Continuation of Ser. No. 22,898, Feb. 26, 1993, abandoned.

[30] Foreign Application Priority Data

Feb. 28, 1992 [SE] Sweden .................................. 9200607

[51] Int. Cl.$^6$ ....................................................... H04J 4/00
[52] U.S. Cl. ........................... 370/330; 370/337; 375/202
[58] Field of Search .................................. 455/49.1, 50.1, 455/63, 67.1, 67.3, 115, 134, 135, 226.1, 226.2, 226.3, 266, 277.2, 278.1, 296, 56.1, 33.1, 33.2, 33.3, 33.6; 375/201, 202, 203; 370/50, 69.1, 57, 95.1, 66, 95.2, 68, 95.3, 96.1, 110.1, 100.1, 105.1, 105.2

[56] References Cited

U.S. PATENT DOCUMENTS

| | | | |
|---|---|---|---|
| 4,799,252 | 1/1989 | Eizenhöffer et al. | 379/59 |
| 4,866,710 | 9/1989 | Schaeffer | 370/95.1 |
| 4,955,082 | 9/1990 | Hattori et al. | 370/95.1 |
| 5,020,056 | 5/1991 | Chennakesha | 370/95.3 |
| 5,200,957 | 4/1993 | Dahlin | 370/100.1 |
| 5,291,475 | 3/1994 | Bruckert . | |

FOREIGN PATENT DOCUMENTS

| | | |
|---|---|---|
| WO90/16122 | 12/1990 | WIPO . |
| WO91/13502 | 5/1991 | WIPO . |

OTHER PUBLICATIONS

D. Verhulst et al., "High Performance Cellular Planning with Frequency Hopping", Proceedings DMR IV, Oslo, Norway, pp. 26-28 (Jun. 1990).

(List continued on next page.)

*Primary Examiner*—Wellington Chin
*Assistant Examiner*—Huy D. Vu
*Attorney, Agent, or Firm*—Burns, Doane, Swecker & Mathis, L.L.P.

[57] ABSTRACT

According to method and apparatus for communication in a cellular TDMA mobile radio communication system with channel hopping, base and mobile stations transmit radio signal bursts in time slots of a plurality of radio channels in accordance with channel hopping schemes. All of the schemes used by a base and mobile stations in a cell are free from coincidence on any radio channel with any other of the schemes used for transmission within the same cell. A scheme used by a mobile station in one cell occasionally coincides on a radio channel with a scheme used by a mobile station in another cell. The major part of every channel shifting scheme used by a mobile station in a cell is free from coincidence on any radio channel with the major part of any channel hopping scheme used by a mobile station in another cell. The signal to interference ratio or other signal characteristics such as signal strength or bit error rate for signals received by mobile stations are estimated and compared, and the output power of stations are controlled. The existence of further possible channel hopping schemes in a cell, free from coincidence on every radio channel with every other of the channel hopping schemes already in use in that cell, is checked. When another connection to a particular mobile is desired and there is a possible mobile scheme free from coincidence, the desired connection is established using the possible channel hopping scheme in the cell, only if the estimated C/I for certain mobile stations involved in connections exceeds a minimum level.

22 Claims, 12 Drawing Sheets

OTHER PUBLICATIONS

D. Verhulst et al., "Slow Frequency Hopping Multiple Access for Digital Cellular Radiotelephone", IEEE Journal on Selected Areas in Communications, vol. SAC-2, pp. 563–574 (Jul. 1984).

J. Dornstetter et al., "Cellular Efficiency with Slow Frequency Hopping, Analysis of the Digital SFH 900 Mobile System", IEEE Journal on Selected Areas in Communications, vol. SAC-5, pp. 835–848 (Jun. 1987).

ETSI/GSM, "Physical Layer On The Radio Path: General Description", GSM Recommendation: 05.01, Version 3.3.1, Jan. 1990, cover page and pages 1–6.

Slot format mobile station to base station (traffic channel)

Slot format base station to mobile station (traffic channel)

FREQUENCY AND CHANNEL HOPPING COMMUNICATION IN A TDMA CELLULAR MOBILE RADIO SYSTEM

This application is a continuation of application No. 08/022,898, filed Feb. 26, 1993, now abandoned.

BACKGROUND

This invention relates to the technical field of mobile radio communication. More specificly the invention relates to methods for efficient and flexible use of the frequency spectrum available for communication in a time division multiple access mobile radio communication system. The invention also relates to a base station and a mobile station for flexible and efficient use of the frequency spectrum available in a time division multiple access mobile radio communication system.

Many mobile radio systems are known and in use. The frequency band available for connections in a mobile radio communication system limits the capacity of mobile radio systems. Two base stations or mobile stations transmitting on the same radio channel of a FDMA system or on the same time slot of the same radio channel in a TDMA system may cause interference to each other. This kind of interference is sometimes called co-channel interference because the interference comes from the same radio channel. If the interfering mobiles or bases are sufficiently close in relation to radio propagation properties, the signal strength of the signals relating to one of the connections will not be sufficiently stronger than the interfering signals relating to the other connection. The information on the connection forwarded with the signals transmitted will then be difficult to understand. If the interfering mobiles or base stations are sufficiently distant from each other however, the signals relating to a connection will be sufficiently stronger than the interference signals of the other connection. The information of the connections will then be easily understood.

In order to use the same radio channel in FDMA systems, and the same time slot of a radio channel. In TDMA systems for more than one connection, some mobile radio systems are designed as cellular systems. The geographical area to be covered by a cellular system is divided into smaller areas called cells. Mobiles in a cell communicate with a base station for that cell. Some or all of the available radio channels are distributed among the cells according to a frequency plan.

Normally a conventional frequency plan means different radio channels are allotted to a cluster of adjacent or neighbour cells. No two cells in the same cluster may use the same radio channel. Each radio channel used by the base station or a mobile of one cell in a cluster, is different from every channel used by a base or mobile in another cell in the same cluster. However, cells in different clusters may use the same radio channels. Thus there may be simultaneous multiple use of a radio channel. Such multiple use is sometimes called channel re-use. The distance between cells using the same radio channel is sometimes called re-use distance.

Many different shapes and sizes of cell clusters are known to those skilled in the art, e.g. 3-cell, 4-cell, 7-cell, 9-cell, 12-cell and 21-cell clusters. Somewhat simplified the largest call handling capacity for a cellular TDMA system is achieved when using the smallest cluster which provides sufficiently low co-channel interference.

Athough the frequency plans described provide the important advantage of plural use of radio channels, often called frequency or channel re-use, such fixed frequency plans are cumbersome. Due to geographical variations, the cells, or zones covered by each base station antenna, will vary in size and shape. The coverage area of the system will thus normally be covered by several different known cluster combinations. Commonly, the cluster configuration, or decisions of which re-use patterns to be used, must be made with the aid of complex computer-analysis of the topography in the system.

Also other disadvantages are inherent in the use of fixed frequency plans. Normally, the number of desired connections in a cell varies with time. One cell may not be able to handle all desired connections because all channels and all time slots on TDMA channels alotted to the cell are occupied. At the same time the number of desired connections in an adjacent cell or a neighbour cell or any cell in the same cluster may be substantially less than the total capacity on all channels allotted to that cell according to the fixed frequency plan. Thus all desired connections can not be handled by the cell cluster in spite of the fact that there is at least one free channel or at least a free time slot on a radio channel which could have been used for the desired connections had this not been forbidden by the fixed frequency plan.

One way of reducing the above mentioned disadvantage of fixed frequency plans is not to distribute all radio channels available for connections in a mobile radio communication system, but to reserve a couple of radio channels. All channels but the reserved are distributed according to a frequency plan. The reserved radio channels may be temporarily used by any cell requiring more channels than the channels permanently allotted to that channel in accordance with the frequency plan. Such temporary use of a reserved channel does not cause co-channel interference for another cell already using that reserved radio temporarily channel. While this method of reserving and temporarily allotting some radio channels provides more flexibility with regard to variable connection handling capacity than a fixed frequency plan for all available radio channels, the total handling capacity for the whole system may decrease.

Another method of obtaining high traffic handling flexibility in a various areas of cellular mobile radio system is to completely abolish frequency planning and let all radio channels available for connections be a common resource to all cells. Any cell may use any radio channel available for connections provided there is sufficiently low co-channel interference from others using the same radio channel. This is sometimes called "dynamic channel allocation". While this method affords advantages with respect to changing call handling capacity for a cell, this method also has drawbacks.

Power conservation is an important aspect of small light weight portable battery powered mobile stations. In a normal telephone call, pauses in speech are frequent and quite long in relation to a radio channel time slot. Transmitting radio signals when there is no information to forward is a waste of battery power. Discontinuous transmission means the transmission is interrupted when there is a pause in the speech of a call or no information is being forwarded in ongoing connection.

Another way of saving battery power in a mobile station is to control the strength of transmitted radio signals in response to measured signal strength at the receiving base station. If the signal strength at the receiving base station is neglected, a mobile must always transmit radio signals with a strength sufficient for a worst case condition, e.g. when the mobile station is located at the fringe of a cell. For most locations such a signal strength is excessively high. If the strength of received signals are measured, a base station may send power control messages to the mobile permitting a reduction of the mobile transmit power whenever an excessive signal level is detected.

Some cellular mobile radio communication systems using digital modulation of radio signals transmitted are now in commercial wide scale use. One type of mobile radio communication system used in the USA is specified in the document EIA/TIA, Cellular System, Dual-Mode Mobile station—Base Station Compatibility Standard, IS-54, published by ELECTRONIC INDUSTRIES ASSOCIATION, Engineering Department, 2001 Eye Street, N.W. Washington, D.C. 20006, USA. This system has both FDMA radio channels for radio signals with analog modulation and TDMA radio channels for radio signals with digital modulation. For exhaustive information on this system, reference is given to the aforementioned publication, the subject matter of which is incorporated herein by reference.

The pan European digital cellular system abbreviated GSM is a type of digital mobile radio communication system in use in Europe. This system is specified in the document Recommendation GSM from ETSI/TC GSM, published by European Telecommunication Standardization Institute, ETSI B.P. 152-F-06561 Valbonne Cedex, France. For exhaustive information on this system, reference is given to the aforementioned publication, the subject matter of which is incorporated herein by reference.

Both the system according to TIA IS-54 and the GSM system are TDMA systems with many radio channels disposed in separate frequency bands. In a TDMA mobile radio system one obvious way of using the radio channels allotted to a cell would be to use one time slot of one radio channel allotted to the cell for a particular connection as long as possible, i.e. until termination or handoff of a connection. This is also done according to the aforementioned EIA/TIA IS-54 standard.

In a conventional TDMA system, where the same radio channel and time slot are used throughout a connection, any co-channel interference will last as long as both the connections last because the transmissions occur more or less simultaneously on the same radio channel. This means a worst case situation must be considered in frequency planning and cell cluster design. Frequency hopping has been suggested to circumvent this case.

According to one optional embodiment of the GSM system, time slots on plural radio channels alotted to a cell are used for one and the same connection. Any base and mobile transmits a sequence of radio signal bursts. Each burst is confined to a time slot, but the bursts are distributed on a plurality of radio channels. This affords advantages far as multipath propagation is concerned.

Embodiments of a GSM system with frequency hopping are discussed in the article "High performance cellular planning with Frequency Hopping", by Didier Verhulst and Colin Rudolph, published in Proceedings DMR IV, 26–28 Jun. 1990, Oslo, Norway, the subject matter of which is incorporated herein by reference. According to the article, frequency hopping provides advantages such as smaller optimum cluster size and more flexible frequency planning. The maximum connection handling capacity becomes interference limited and implementation of discontinuous transmission affords increased maximum capacity with even the smallest cluster sizes. The smallest cluster size investigated is 7-cell but the article also mentions that a "plain 3 cell cluster can in fact also be envisaged".

Another type of digital mobile radio communication system, somewhat different from the above described systems, using time division multiple access radio channels is the broadband code division multiple access system, abbreviated CDMA. In normal broadband CDMA systems, all the radio signal transmissions relating to different connections involving the mobile stations are not separated in time slots or in different narrow band radio channels. Also, in a normal broadband CDMA system there is no fixed frequency plan. Instead the base and mobile station, both in the same cell, and in surrounding cells deliberately transmit radio signals relating all connections simultaneously on the same wideband radio channel. As a consequence the co-channel interference in a CDMA system will be very high in relation to such interference in previously described TDMA systems. More precisely the interference level in CDMA systems will normally be several times higher than level of the desired radio signal relating to the connection.

The reason why a CDMA system can handle high levels of co-channel interference is the wide bandwidth of each radio channel used. The wideband radio channel in CDMA will normally have a bandwidth equivalent to several of the narrow bandwidth radio channels used in TDMA or FDMA systems. The wide bandwidth allows for a high degree of channel coding. Such coding makes it possible for the mobile and base station-receivers to recognize the desired signal from all other signals even though the interference level exceeds the level of the desired signal. A feature of the CDMA systems is that the number of connections permitted within a frequency band is not limited by the number of time slots/radio channels. Instead the call handling capacity is limited by the maximum level of co-channel interference which still permits the mobile and base station receivers to detect their desired signals.

In a CDMA system, power control and discontinuous transmission reduces the average total power of interfering signals. Thus, discontinuous transmission means reduced co-channel interference and increased capacity in a CDMA system, since the capacity generally depends on the average interference level. This is an advantage CDMA systems share with some frequency hopping TDMA systems in relation to prior art TDMA systems without frequency hopping.

Some different types of mobile radio systems similar to CDMA are discussed in the article "Slow Frequency Hopping Multiple Access for Digital Cellular Radiotelephone", by Didier Verhulst, Michel Mouly and Jacques Szpirglas, published in IEEE JOURNAL ON SELECTED AREAS IN COMMUNICATIONS VOL SAC-2, NO 4, JUL. 1984, pages 563–574, the subject matter of which is incorporated herein by reference. Various types of systems with somewhat different frequency hopping protocols, implementation of discontinuous transmission and power control are mentioned. One system protocol called "random SFHMA" does not have a reuse cluster and each user has his own personal sequence that is uncorrelated with the sequences of the other users. However, co-channel interference from mobiles in the same cell is not avoided. According to the slow frequency hopping scheme, abbreviated SFH, the mobile stations do not transmit separated radio signal bursts in time slots of frames on TDMA radio channels but transmit more continuously without burst separations of a length corresponding to time slots. The hopping pattern for transmission from mobile stations is part of the channel coding used to suppress the co-channel interference.

A slow frequency hopping scheme convertible for use in combination with TDMA is discussed in the article "Cellular Efficiency with Slow Frequency Hopping, Analysis of the Digital SFH 900 Mobile System" by Jean-Louis Dornstetter and Didier Verhulst, published in IEEE JOURNAL ON SELECTED AREAS IN COMMUNICATYTIONS VOL SAC-5, NO 5, JUN. 1987, pages 835–848, the subject matter of which is incorporated herein by reference. When analyzing possible performance of this system, discontinuous transmission and power control are assumed to be implemented. In this article the minimum cluster size mentioned is the 3-cell cluster.

A method and apparatus for frequency hopping in a cellular radiotelephone system is disclosed in PCT patent application WO 91/13502. The object is to increase the number of available carriers to hop between in each coverage area. Instead of permanently allocating to each coverage area (cell) within a reuse diameter (cluster) a fraction of the carriers available within the reuse diameter, all or almost all of the carriers are allocated to each coverage area at noncoinciding time intervals. The hopping is performed in at least rough time-synchronism from sector to sector and from cluster to cluster to avoid same channel interference and adjacent channel interference within the reuse diameter. The method relies fundamentally upon sharing a carrier among various coverage areas synchronously in time, but does not require a slotted TDMA channel structure. Thus the cells within a cluster are allowed to share available frequencies while still maintaining a re-use pattern. The re-use pattern is maintained on a frame basis, i.e. the hopping may be viewed as using a new frequency plan for each frame. This method has the drawback of requiring synchronized base stations, in particular within each cell cluster, and to some extent between adjacent clusters. Another disadvantage is that no cell can simultaneously serve a number of mobiles corresponding to the total number of radio channels available to the cluster. Any call can only serve a number of mobiles corresponding to the number of radio channels simultaneously available to that cell, which is only a fraction of the total number.

SUMMARY

Although the new TDMA systems with frequency hopping and CDMA mobile radio communication systems afford substantial advantages over prior FDMA and TDMA systems without frequency hopping there is a need for even more efficient use of the frequency bands available for connections in the mobile radio systems in order to increase the total connection handling capacity. There is also a need for an even more flexible use of the available frequency bands in order to increase the ability of systems to handle a varying number of desired connections in varying parts of the area covered by the systems.

Although prior suggested mobile radio systems may use some kind of frequency hopping in combination with some embodiments of various methods like discontinous transmission and transmission power control, they have not incorporated embodiments of frequency hopping and other methods, the basic principles of which are known per se, in a way affording the maximum capacity for handling connections in an individual cell and simultaneously the maximum flexibility in sharing the connections to be handled between adjacent cells.

It is one object of the present invention to provide a method and apparatus for providing a maximum number of simultaneous connections which any cell in a TDMA mobile radio system can handle without increasing the total frequency band(s) available for all connections in the TDMA mobile radio system.

Another object of the present invention is to provide a method and apparatus for very flexible sharing of the connections handled by adjacent cells in a cellular TDMA mobile radio system.

A similar object of the present invention is to make the maximum number of simultaneous connections each cell in a TDMA system can handle, substantially dependent upon the number of connections simultaneously handled by adjacent cells, whereby one cell can conveniently handle more simultaneous connections than the maximum average for a cell if all cells handled the same number, provided some adjacent cells simultaneously handle less simultaneous connections than the maximum average when all cells handle the same number.

Yet another object of the present invention is to reduce, if not completely avoid, the need for planned sharing of radio channels.

Still another object of the present invention is to provide method and apparatus whereby the absence of any conventional frequency plan in a cellular TDMA mobile radio system does not cause too severe co-channel interference problems.

The method and apparatus for communication in accordance with the present invention are based on the inventive insight that a TDMA system with frequency hopping, using frequency hopping sequences or schemes avoids co-channel interference within a cell, but allows co-channel interference between adjacent cells, avoids the need for frequency planning and provides great capacity and flexibility. In particular, the system operates when discontinuous transmission and certain transmission power control is implemented. Power control of mobile stations is necessary when a method according to the invention is implemented in a system requiring high capacity and flexibility.

An important element of the method and apparatus according to the present invention is frequency hopping. Frequency hopping may also be described as a frequent change of the radio channel used for a connection, which may be called channel hopping. A base or mobile station involved in a connection does not always transmit its radio signal bursts relating to a particular connection in the same time slot of the same radio channel. Instead the bursts of radio signals relating to a particular connection are distributed on the time slots of a plurality of radio channels in accordance with particular hopping schemes or sequences. According to the invention, mobile stations in the same cell or served by the same base station never simultaneously transmit radio signals in the same time slot of the same radio channel. However, a mobile station in one cell of a cellular TDMA mobile radio system may transmit one of its bursts on the same radio channel simultaneously with one of the bursts of a mobile station in an adjacent cell of the same system. However, no mobile involved in a connection in one cell transmits a sequence of bursts relating to a particular connection so that all of them coincide on a radio channel with one burst in a sequence of bursts from one other mobile involved in an other connection in an adjacent cell. In other words, among a large number of bursts transmitted from one mobile station in one cell, not more than a small minority coincide on any radio channel with any burst among a large number of bursts transmitted from a different mobile station in an adjacent cell. Still another way of expressing almost the same thing is, that a mobile station in one cell selects radio channels and time slots for transmission independently of a mobile station in an adjacent cell. The channels on which mobile stations transmit in one cell are uncorrelated to the radio channels on which mobile stations transmit in an adjacent cell. Thus coincidence on any radio channel for bursts transmitted from two particular mobiles in adjacent cells involved in connections is infrequent and incidental. However, when there are many mobiles involved in connections in two adjacent cells, coincidence of bursts transmitted from one particular mobile station in one of the cells on any radio channel with any burst transmitted by any mobile in the adjacent cell is more frequent.

According to another aspect of the present invention two or more adjacent cells of a cellular TDMA system may all use some radio channels, and a majority, if not all, of the radio channels any of two adjacent cells may use, the adjacent cell may also use.

DETAILED DESCRIPTION

Figure 1:
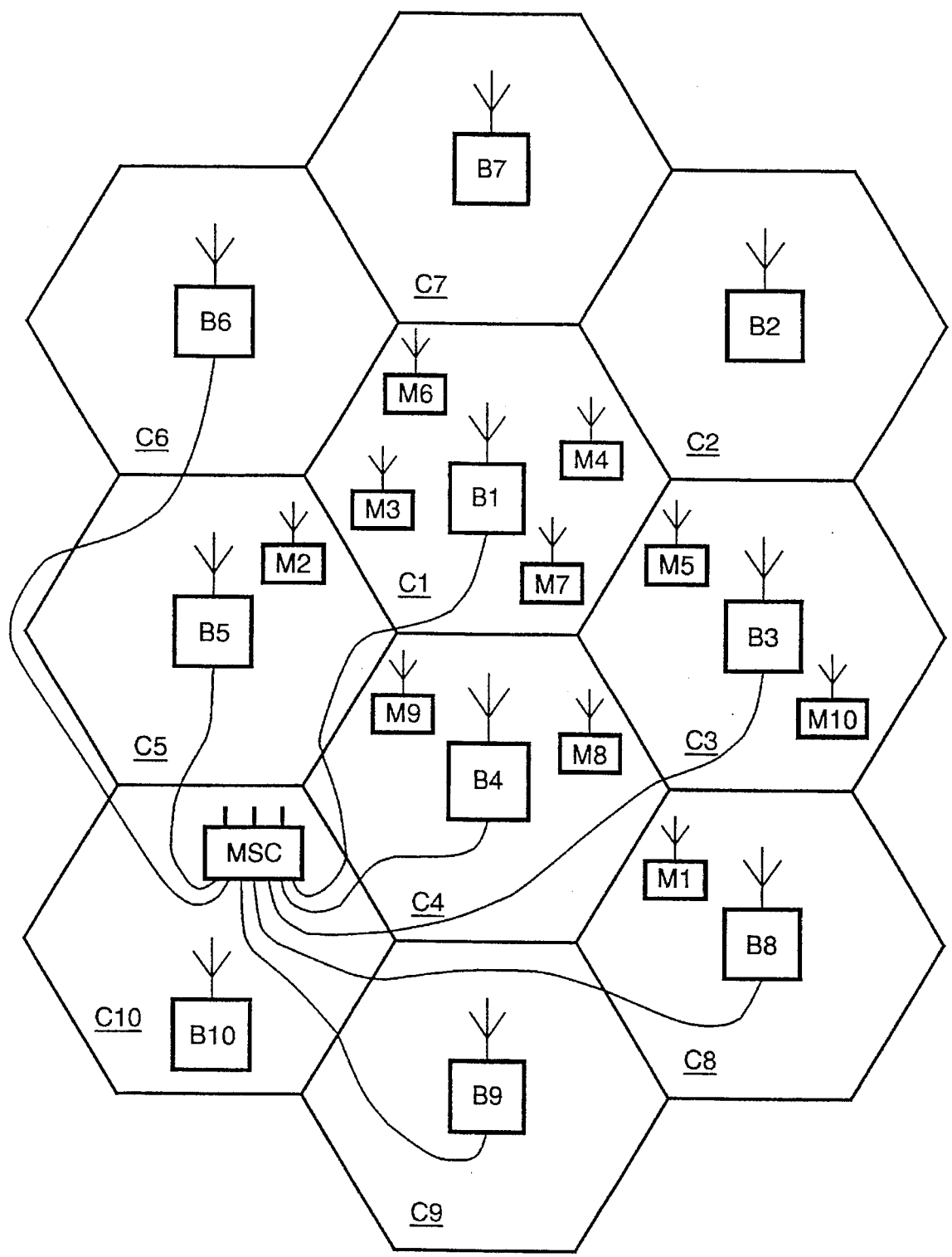
FIG. 1 illustrates a cellular mobile telephone system.

FIG. 1 illustrates ten cells C1 to C10 in a cellular TDMA mobile radio system. For each cell C1 to C10 there is a corresponding base station, abbreviated BS, denoted B1 to B10. The BSs are situated in the center of the cells and have omnidirectional antennas. Ten mobile stations, abbreviated MSs, are also shown. They may be small light-weight battery powered portable stations or more bulky, vehicle installed stations, powered by the vehicles electric power system. The BSs are moveable within a cell and from one cell to another. A mobile switching center, abbreviated MSC, is connected to all the BSs by cables or any other fixed means, like a radio link. Some of these cables or means are omitted in FIG. 1 for simplicity. The MSC is also connected by cables or links to a fixed public telephone network or a similar fixed communication network.

During operation the mobile stations will be in contact with the fixed part of the system by transmission of radio signals to, and reception of radio signals from, the different base stations. Telephone calls, data communication links or other communication paths may be set up between one mobile station and another mobile station in the system. Calls may also be set up to mobiles in another system or subscribers in the fixed network. In this application these are all called connections irrespective of whether they originate in a mobile or end in a mobile.

FIG. 1 typically represents part of a larger system. Normally the system will comprise more cells and base stations. There may be umbrella cells each covering an area also covered by a group of micro cells. Also the number of mobile stations will normally be much larger. Base stations located in the vicinity of the cell borders and with sector antennas are also common. Some cells may be served by more than one base station. Several other MSCs with connected base stations will normally exist and the mobile stations are usually free to communicate via these MSCS.

Figure 2A:
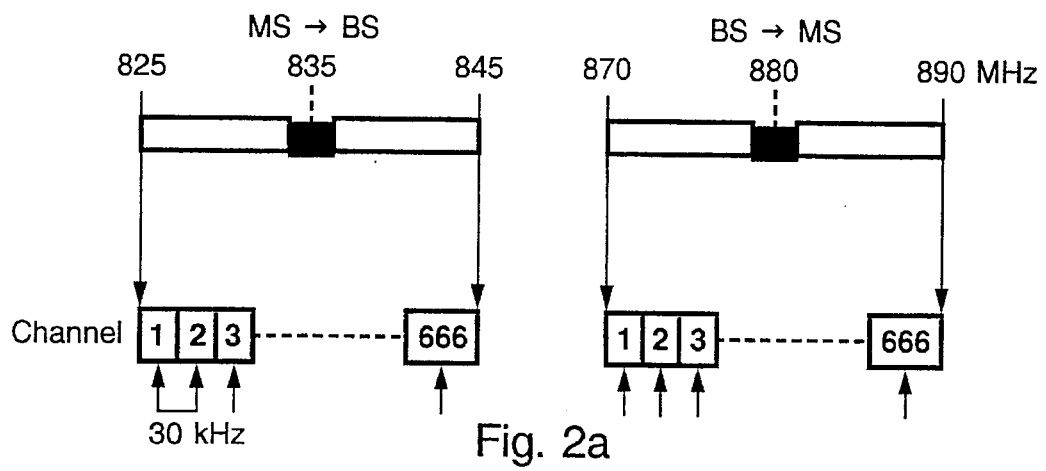
FIGS. 2A to 2E illustrate two frequency bands available for a cellular mobile radio system, a configuration of radio channels within the frequency bands and time formats on radio channels.

FIG. 2A illustrates two separate frequency bands available for a cellular mobile radio system. A possible configuration, according to IS-54, of radio channels within the frequency bands is also shown.

One frequency band has a range from about 825 MHz to about 845 MHz and contains radio channels used for transmission of radio signals from the mobile stations to the base stations. The other frequency band has a range from about 870 MHz to about 890 MHz and contains radio channels used for transmission of radio signals from the base stations to the mobile stations. Each radio channel has a bandwidth of about 30 kHz which means there is room for 666 radio channels in each direction of transmission.

The radio channels may be used as analog traffic channels, as digital traffic channels, as analog control channels. The analog control channels are used for signalling during call setup, for notifying the MS of an incoming call (paging) and for monitoring the status of the MS while not communicating on any traffic channel. The MS will be tuned to an analog control channel as long as it is not involved in a call or other connection over an analog or digital traffic channel. The analog control channels are located at the centre of the frequency bands. Thus, the analog control channels from mobile to base stations are located closest to 835 MHz while the control channels for transmission from base to mobile are located closest to 880 MHz.

The analog traffic channels are used for telephone calls and other analog connections involving a mobile station. In addition to speech relating to one call, the radio signals transmitted on an analog traffic channel may carry some signalling associated with the call. A normal telephone call or other bidirectional connection involving a mobile station, requires both transmission from the base station and transmission from the mobile station. Thus for a normal telephone call one analog traffic channel in each direction is required.

Figure 2B:
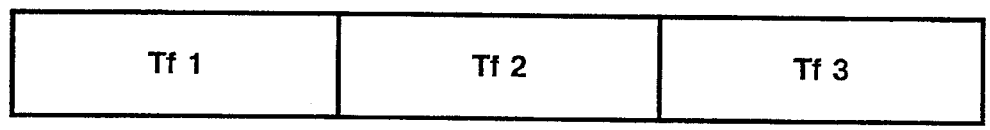
Figure 2C:
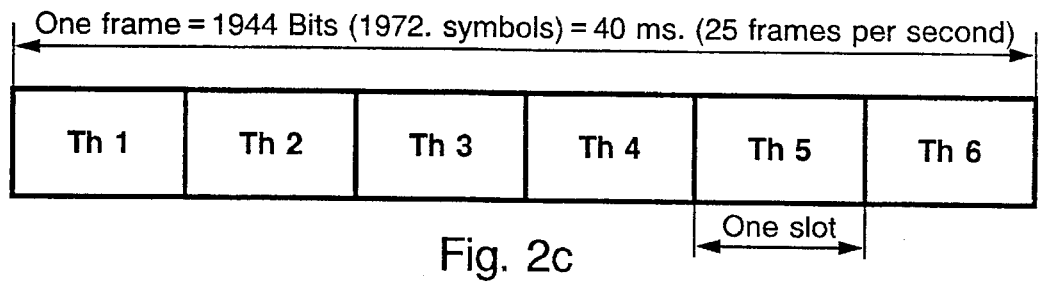

The radio channels used for digital traffic channels are divided in time slots. A frame on such a radio channel may comprise three full rate time slots, Tf1–Tf3, as illustrated in FIG. 2B, or six half rate time slots, Th1–Th6, as illustrated in FIG. 2C. A normal telephone call, or other full rate connection, requires one full rate time slot Tf per frame for transmission from base to mobile and one full rate time slot Tf per frame for transmission from mobile to base station.

Figure 2D:
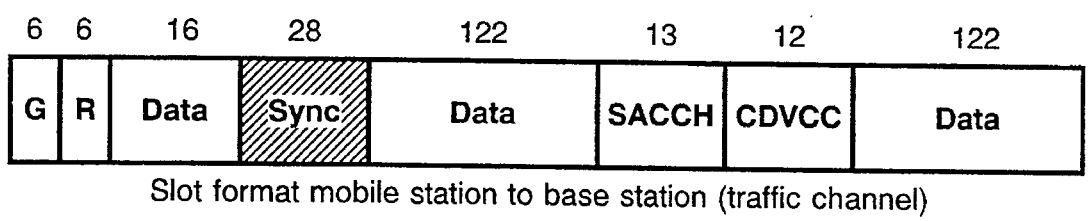
Figure 2E:
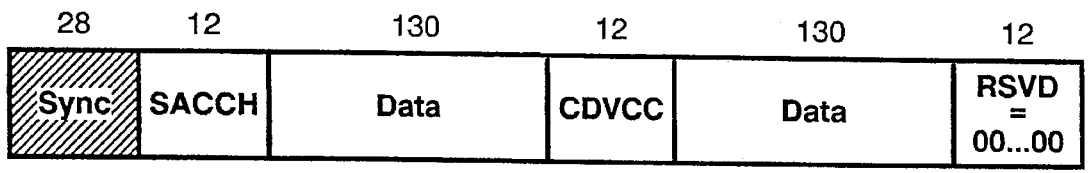

The slot format for information on a digital traffic channel is slightly different in different directions. FIG. 2D illustrates the format for transmission from a mobile station, while FIG. 2E illustrates the format for transmission from a base station. The time slot formats commonly include 260 bits reserved for data transmission, 12 bits for a digital verification voice color code, DVCC, 12 bits for a slow associated control channel, SACCH, and 28 bits for synchronization and training data, SYNC. The slot format from the mobile station to the base station includes two 6 bit blocks for guard time, G, and ramp time, R, information. The slot format from the base station to the mobile station includes a 12 bit block which is reserved for future uses.

A cellular system is based upon reuse of the same radio channel in different cells. In a conventional cellular system, with a fixed frequency plan, all the available radio channels are divided into channel groups, which in turn form a cluster. Each cell within a particular cluster is allotted a unique group of channels. Thus no two cells in the same cluster are alotted the same channel. However, corresponding cells in different clusters are allotted identical groups of radio channels if a fixed frequency plan is implemented.

Figure 3A:
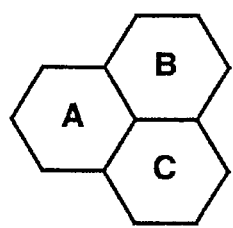
FIGS. 3A to 3E illustrate various clusters of cells associated with frequency plans.
Figure 3B:
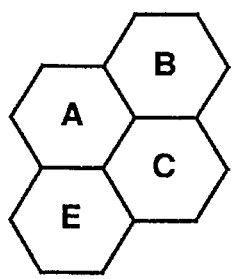
Figure 3C:
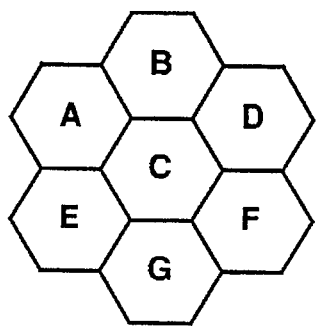
Figure 3D:
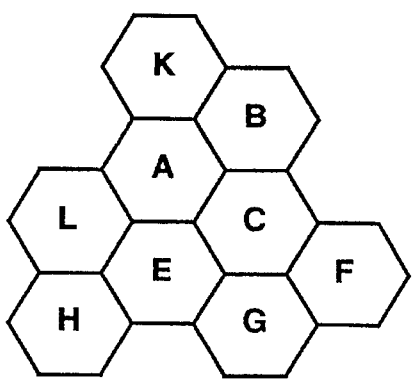
Figure 3E:
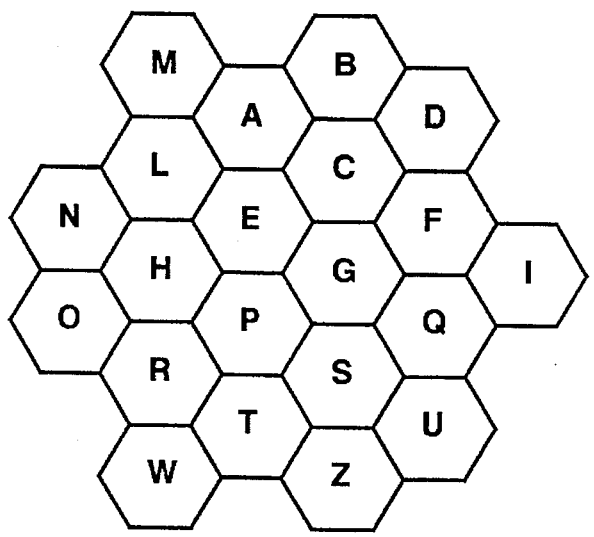

FIGS. 3A to 3E illustrate conventional frequency plans and clusters of cells. FIG. 3A illustrates a 3-cell cluster, FIG. 3B a 4-cell cluster, FIG. 3C some cells of a cellular system with a 7-cell cluster, FIG. 3D a 9-cell cluster and FIG. 3E illustrates a 21 cell cluster. Normally a cellular system comprises many more cells than illustrated in FIG. 3. Such a system may result if one of the pattern of cells illustrated in FIG. 3 is repeated to fill the total geographical coverage-zone of a mobile telephone operator.

As an illustrative example it is assumed that 252 out of the totally 666 radio channels according to FIG. 2a are available for use as digital traffic channels, while the rest are used for analog control channels and analog traffic channels. Assuming a fixed frequency plan, each cell would dispose of 84 such radio channels in a 3-cell cluster system, 63 such radio channels in a 4-cell cluster system, 36 such radio channels in a 7-cell cluster system, 28 such radio channels in a 9-cell cluster system and 12 such radio channels in a 21-cell cluster system.

Generally clusters with many cells means the available number of radio channels has to be shared by a large number of cells. Clusters with few cells means the available number of radio channels has to be shared by fewer cells. Thus using clusters with more cells means the average number of radio channels per cell decreases, when using a cluster with fewer cells. Thus, large clusters means less total call handling capacity for the system. From a capacity point of view it would be desirable to have the smallest possible cluster sizes. This will increase the number of channels per area and thus the system capacity. In prior art TDMA systems small cluster sizes are however, not permitted by the high margins required against co-channel interference from adjacent cells.

Generally, big clusters with many cells of a certain size means a greater distance between base and mobile stations using the same radio channel than small clusters with few cells of the same size. Thus, big clusters have larger re-use distances than smaller clusters. Thus generally clusters with many cells normally means less co-channel interference. From a pure co-channel interference point of view, big clusters are preferred in TDMA systems with fixed frequency plans.

Figure 4A:
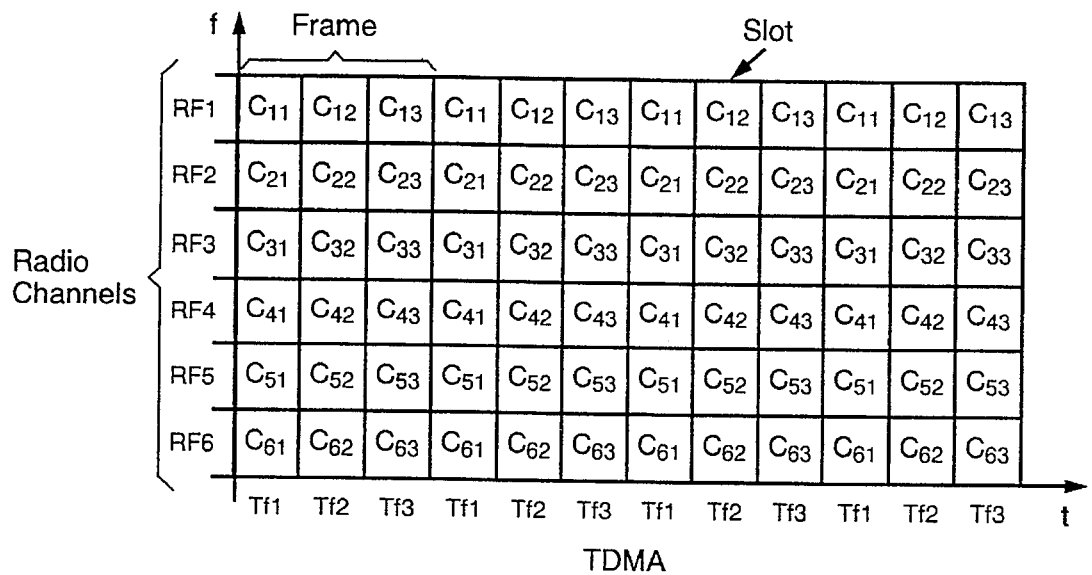
FIGS. 4A and 4B illustrate one basic difference between conventional communication in a TDMA system and communication in a TDMA-FH system with channel hopping.
Figure 4B:
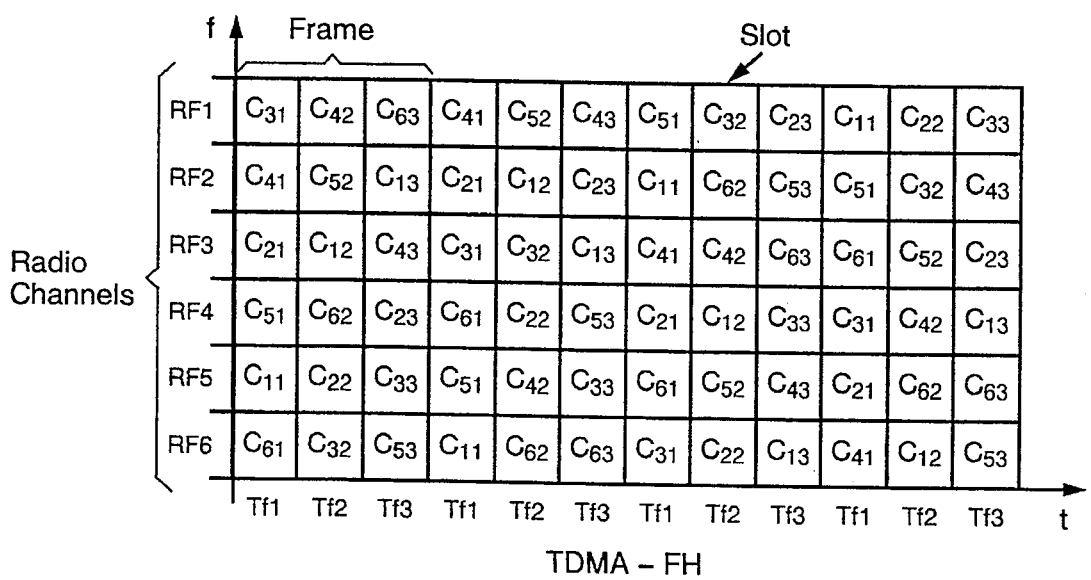

FIGS. 4A and 4B illustrate one principal difference between a conventional TDMA system and a TDMA-FH system using frequency hopping. Both systems use six TDMA radio channels, RF1–RF6, each having three time slots, Tf1–Tf3, per frame. Four frames are shown on each radio channel. In the conventional system, according to FIG. 4A, the time slot Tf1 of each frame of the radio channel RF1, with the highest center frequency, is assigned to the connection C11, the time slot Tf2 of each frame to connection C12, and the time slot Tf3 of each frame to connection C13. For the radio channel RF2 the time slots Tf1 to Tf3 of each frame are assigned to the connections C21 to C23 respectively. The time slots Tf1 to Tf3 of radio channels RF3 to RF6 are in the conventional system assigned to the connections C31 to C63 respectively. Thus, in the conventional system, the connections C11 to C63 always use the same time slot of the same radio channel until there is a handoff. Assigning of radio channel time slots in a conventional TDMA system could therefore be described as assigning to each connection one combination of a radio channel and a time slot, this combination remaining unchanged until termination or handoff of the connection.

In a TDMA-FH system using channel hopping, according to FIG. 4B, the time slot Tf1 of the first frame of radio channel RF1 is assigned to connection C31. However, the time slot Tf1 of the second frame of radio channel RF1 is assigned to connection C41, the time slot Tf1 of the third frame of RF1 is assigned to connection C51, and the time slot Tf1 of the fourth frame of RF1 is assigned to connection C11.

The time slot Tf2 of the first frame of radio channel RF1 is assigned to connection C42, whereas the timeslot Tf2 of the second frame of radio channel RF1 is assigned to connection C52, the time slot Tf2 of the third frame is assigned to C32, and the time slot Tf2 of the fourth frame of RF1 is assigned to C22. The time slots Tf3 of the first to fourth frames of RF1 are assigned to connections C63, C43, C23 and C33 respectively.

The time slots Tf1, Tf2 and Tf3 of the first frame of radio channel RF2 are assigned to connections C41, C52 and C13 respectively, whereas the time slots of the second frame of radio channel RF2 are assigned to connections C21, C12 and C23, respectively. The rest of the assignments are evident and will therefore not be explicitly mentioned.

Comparing the frames of radio channels RF1 to RF6 in FIG. 4B reveals that the corresponding time slots of succeeding frames of radio channels are assigned differently. All connections are assigned different radio channels in different frames. In the particular example of FIG. 4B, no connection is assigned the same radio channel and time slot in succeeding frames of the same radio channel. No connection is assigned one combination of a radio channel and a time slot remaining unchanged during the time period of plural frames. Instead, each connection is assigned a set of four combinations of a frequency and a time slot for use in four succeeding frames. Thus the corresponding time slots, e.g. Tf2, in the four succeding frames of any radio channel, e.g. RF1, are used by different connections in the same cell.

FIG. 4B is one of the simplest ways of assigning radio channel/time slots in one frame different from another frame to the connections. In preferred embodiments of the present invention many more radio channels than six are used, whereby any connection for the total time period of plural succeeding radio channel frames, may be assigned different radio channel time slots in a plurality of succeeding frames. Thus each connection could be assigned a scheme including a sequence of a plurality of combinations of radio channels and time slots. In this application such a sequence of combinations of radio channels and time slots is called a channel hopping scheme. It might also be called a frequency hopping scheme or pattern. According to FIG. 4B, a succeeding burst pertaining to any connection is always transmitted on a different radio channel than the burst pertaining to the same connection. This is not necessary in all embodiments of the invention. Instead two adjacent bursts pertaining to the same connection may be transmitted in the same time slot of adjacent frames on the same radio channel. In cellular bidirectional mobile radio communication systems radio channel hopping should preferably be implemented in both directions. If FIG. 4B illustrates the radio channel time slot combinations used for one direction of communication, e.g. from mobile to base station, then the pattern of radio channel time slot combinations used for the other direction could be the same as FIG. 4B, using other radio channels. However, for certain reasons it might be preferred not to transmit radio signals and simultaneously receive radio signals at a mobile station. Then a different pattern than FIG. 4B should be used for the other direction of communication.

In a conventional TDMA system without frequency hopping, the radio signal bursts pertaining to connections of one cell may interfere with the radio signal bursts pertaining to connections of a cell at a reuse distance. Due to the fact that succeeding bursts pertaining to a connection are transmitted on the same time slot of the same radio channel, the bursts of one connection in one cell will interfere with the bursts of one connection in the other cell.

Figure 5A:
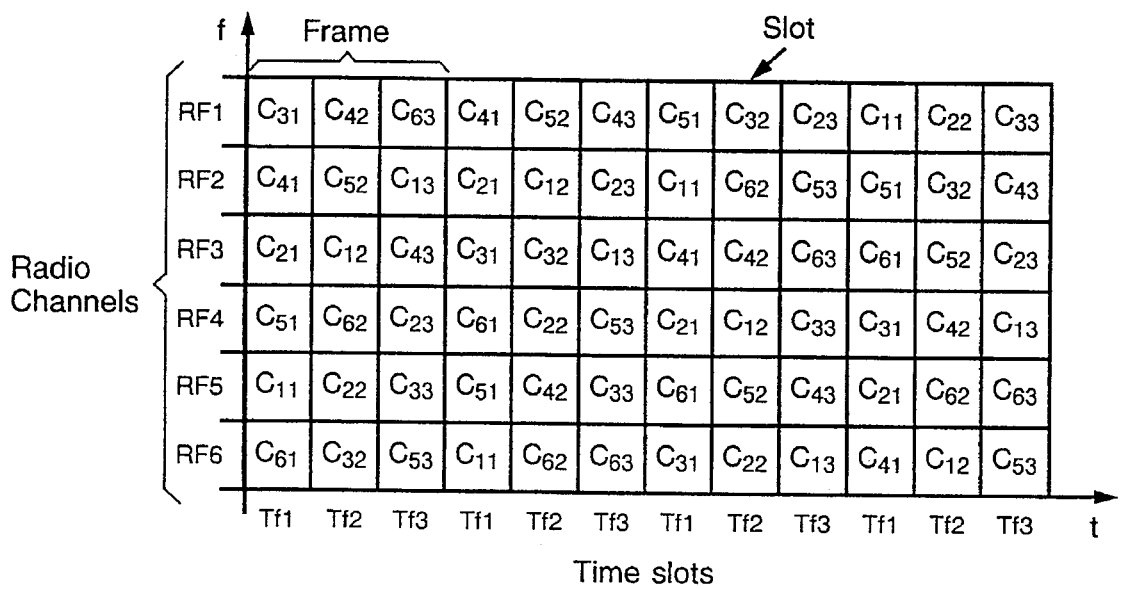
FIGS. 5A and 5B illustrate TDMA-FH in two cells and the co channel interference situation in TDMA-FH.
Figure 5B:
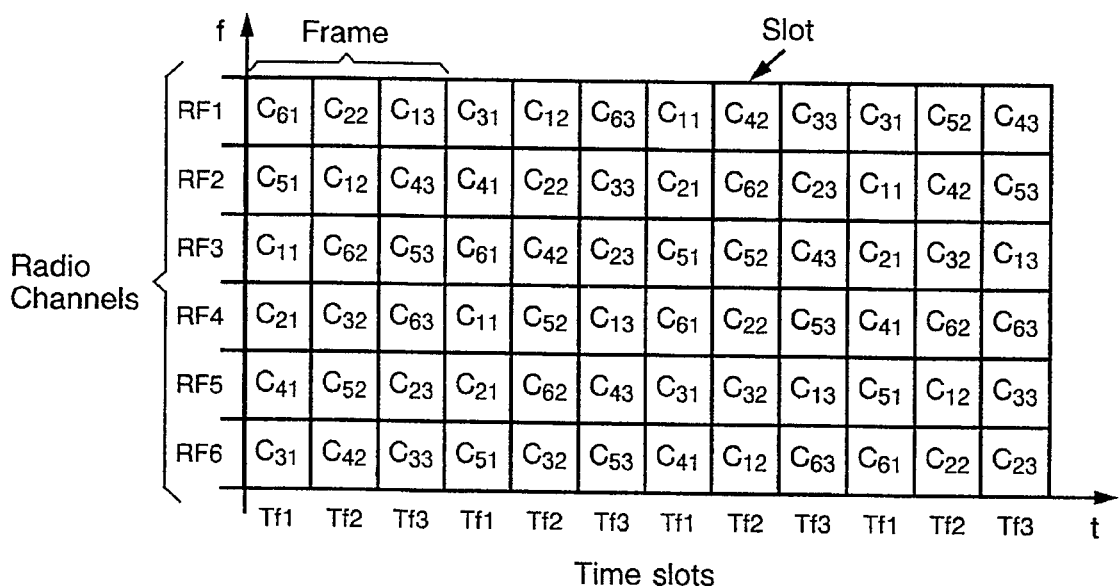

FIGS. 5A and 5B illustrate a co-channel interference situation when using different channel hopping schemes in two cells of a cellular TDMA mobile radio communication system.

FIG. 5A illustrates how the bursts pertaining to 18 connections C11, C12, C13, C21, C22, C23, C31, C32, C33, C41, C42, C43, C51, C52, C53, C61, C62 and C63 are transmitted in time slots of six radio channels RF1, RF2, RF3, RF4, RF5 and RF6 during a time period of four frames in a first cell. All the time slots of all the frames of all the radio channels are used in the first cell.

FIG. 5B illustrates how the bursts pertaining to 18 connections C11, C12, C13, C21, C22, C23, C31, C32, C33, C41, C42, C43, C51, C52, C53, C61, C62 and C63 are transmitted in the time slots of the same six radio channels RF1, RF2, RF3, RF4, RF5 and RF6 during the same period of four frames in a second cell. All the time slots of all the frames of all the radio channels are used in the second cell. Thus during a frame the same six radio channels are used by both cells. All six radio channels are common to both cells.

Comparing FIGS. 5A and 5B reveals that the first burst pertaining to connection C11 in the first cell coincides on the radio channel RF5 with the first burst of connection C41 in the second cell, the second burst of C11 coincides on radio channel RF6 with the second burst of connection C51, the third burst of connection C11 coincides with the third burst of connection connection C21 on radio channel RF2, and the fourth burst of connection C11 coincides with the fourth burst of connection C31 on radio channel RF1. The first burst pertaining to connection C11 in the second cell coincides on the radio channel RF3 with the first burst of connection C21 in the first cell, the second burst of C11 coincides on radio channel RF4 with the second burst of connection C61, the third burst of connection C11 coincides with the third burst of connection connection C51 on radio channel RF1, and the fourth burst of connection C11 coincides with the fourth burst of connection C51 on radio channel RF2.

Generally the bursts pertaining to one connection in one cell do not interfere with the bursts pertaining to one and the same connection in the other cell as may occur in a conventional TDMA system. Instead the bursts of a connection are interfered by bursts from connections which may vary from frame to frame. According to FIG. 5 no time slots are unused. However, if there were only a few connections in each of the first and second cells, so that no bursts were transmitted in many time slots, some bursts would not be interfered with at all.

The co-channel interference situation in FIGS. 5A and 5B is a simplification. Normally the number of cells re-using the same radio channels is large. Some of the cells will be closer and some will be located farther away. Unsynchronized base stations are also possible. In FIG. 5 synchronization is provided for simplicity. The number of radio channels used by each base station would normally be more than six. In a bidirectional communication system, e.g. a cellular mobile radio system, radio channel time slot hopping schemes according to FIGS. 5A and 5B could be used for one direction of communication, e.g. from mobile stations to base stations, and similar or different hopping schemes could be used for the other direction of communication, i.e. from base to mobile stations.

Figure 6:
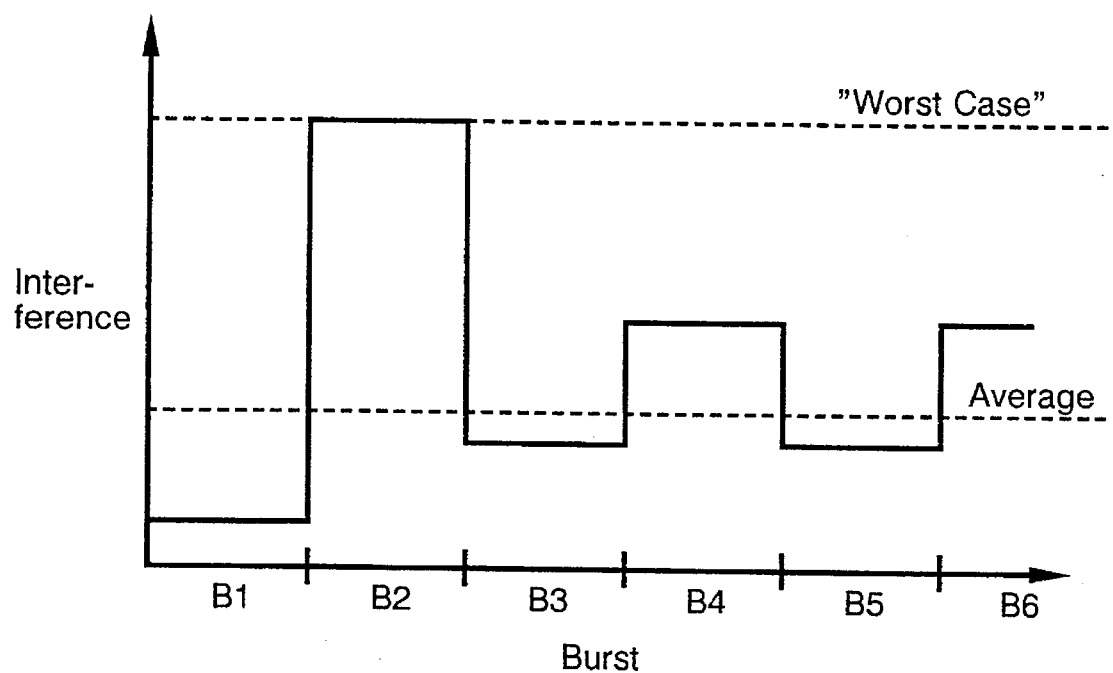
FIG. 6 shows why the commonly used "worst case" design of cluster sizes may be omitted when using TDMA-FH.

FIG. 6 illustrates estimated co-channel interference in TDMA systems and the reason why TDMA-FH according to the present invention enables a change from "worst case" design of cluster sizes in conventional TDMA, to a design based on the statistical average of the co-channel interference from several connections.

The solid curve in FIG. 6 illustrates possible co-channel interference for six radio signal bursts, B1 to B6, transmitted in certain time slots of certain radio channels.

As illustrated in FIG. 6, different bursts are subject to different co-channel interference. The first burst B1 experiences the lowest interference of all six bursts. The second burst B2 is subjected to the highest interference, the level of which is indicated in FIG. 6 by an upper, "worst case" level, dashed line. The co-channel interference for the bursts B3 and B5 is about the same and slightly higher than that of B1. The co-channel interference for B4 and B6 is almost equal and higher than that of B3 an B5. The average of the individual interferences for the individual bursts is indicated with a lower, "average", dashed line in FIG. 6.

In a conventional TDMA system, without frequency hopping, the bursts pertaining to a particular connection are transmitted in the same time slot of the same radio channel, at least until handoff. Thus, in FIG. 6, the bursts B1 to B6 would pertain to different connections. Although succeeding bursts in the same time slot of a radio channel may experience somewhat different co-channel interference e.g. due to mobile station movements, the change in co-channel interference from one burst to the succeeding burst, pertaining to the same connection, is normally small. Thus, for a conventional TDMA system, without frequency hopping, FIG. 6 may somewhat simplified also illustrate the co-channel interference situation for six different connections. In a conventional TDMA system without frequency hopping, the expected "worst case" level is a design criteria when deciding the number of frequency groups in the frequency plan for the system. That is, the system is designed as if all the time slots and radio channels should suffer from the maximum interference level, which in reality is very unlikely to occur.

In TDMA-FH according to the invention the situation is different because the radio signal bursts of a connection are not transmitted on one and the same channel but on different radio channels. The bursts pertaining to a particular connection will therefore normally be subjected to different amounts of co-channel interference, some more and less than the average co-channel interference. Thus for a TDMA-FH system according to the invention, the bursts B1 to B6 illustrated in FIG. 6 may pertain to the same connection. Although a burst, e.g. like B2 in FIG. 6, may be subjected to substantially stronger interference than the average, the probability that the proceeding burst, B1 in FIG. 6 and the succeeding burst, B3 in FIG. 6, will also be subjected to co-channel interference substantially stronger than average, is very small. Thus, although the information in one burst might not be possible to understand by itself, the information in the preceding and/or succeeding burst very often can be understood, whereby the total quality for the connection might not be too severely degraded.

Error protective coding of information to be transmitted in bursts and interleaving of information in bursts are advantageous and might be very important in combination with TDMA-FH according to the invention. If, for example, information is interleaved on two bursts, one subjected to very strong interference and the other is subjected to none or very little interference, after the de-interleaving process only half of the bits will be erased. With efficient error correcting coding it might be possible to correct these erased bits and recover the information transmitted in the burst subjected to severe interference. Interleaving over more than two bursts increases the likelihood of recovering information transmitted in a severely interfered radio signal burst.

The channel hopping according to the invention, together with interleaving and error correcting coding, performs interference averaging. Thus, the minimum cluster size is now constrained by a statistical average of the interference level instead of the "worst case". The statistical average interference level is depicted as the lower dashed line. As seen, the average interference level is expected to be much lower than the "worst case". According to the present invention, frequency planning clusters may be totally avoided.

Interference averaging is not automatically obtained by using any kind of channel hopping. If the channel hopping within cells arranged in a cluster is synchronized, e.g. according to PCT patent application WO/9113502, interference averaging is not obtained unless additional steps are taken. Such synchronized hopping in a cluster of cells causes any two interfering mobiles to hop from one channel to the other channel simultaneously. Thus two mobiles interfering on one channel prior to the channel hop will hop in the same way and therefore interfere after the channel hop.

Figure 7A:
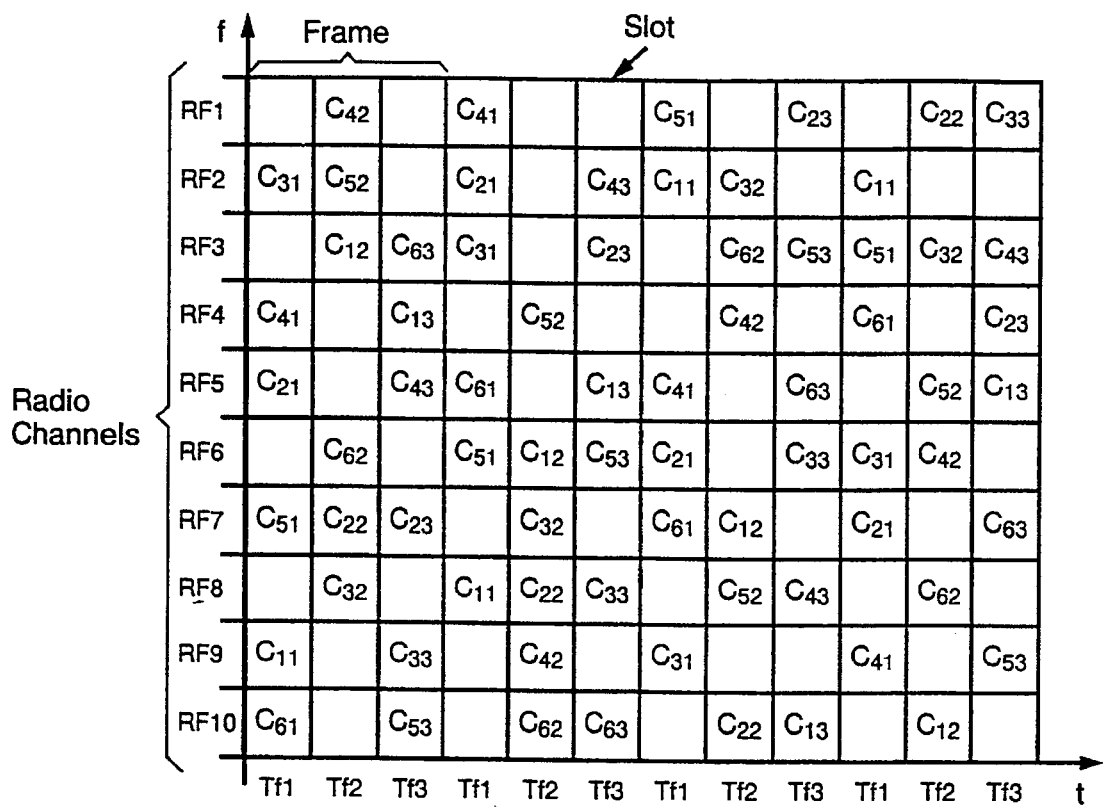
FIGS. 7A and 7B show fractional loading of a cell.
Figure 7B:
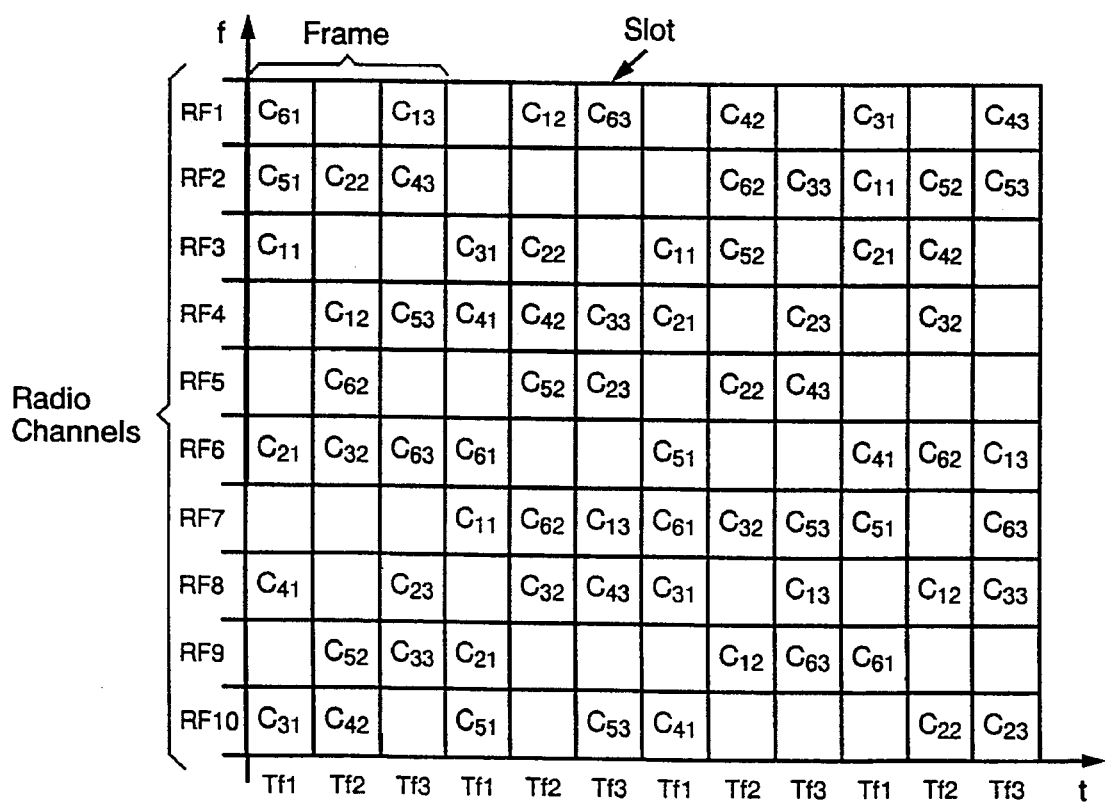

FIGS. 7A and 7B show the principles of an embodiment of the invention that both eliminates stiffness in connection handling capacity and removes the need for frequency clustering. This embodiment might be called fractionally loaded cells or base stations. This implies that the maximum number of simultaneous connections per cell when all cells serve the same number of connections is substantially less than the total number of time slots on all radio channels available for connections at a cell. Fractional loading could also be expressed as limiting the average number of simultaneous connections per cell to be substantially less than the average number of time slots on all radio channels available at a cell.

The FIGS. 7A and 7B depict a subset of ten radio channels Rf1 to Rf10 at base stations in neighbor cells. Each radio channel is divided in frames of three time slot. FIG. 7 shows a fractional load of 60% on the base stations. Thus, the number of simultaneous connections are only 60% of the total number of time slots on all radio channels available for connections, since four out of the ten radio channels are un-used in every time slot. Note however that a burst of a connection may be transmitted in a time slot on any of the available radio channels. Comparing the radio channel time slots used by the two base stations reveals that some of the bursts of a connection may suffer from some interference, while other bursts of the same connection are not subject to interference. During a frame some time slots of some radio channels are used by both cells, some time slots of some radio channels are used by one cell only, and some time slots of some radio channels are not used by any cell. Higher or lower fractions than 60% are theoretically possible but in practice normally much lower fractions are preferred, e.g. 20%.

Fractional loading may be implemented in the following way. The signal to interference ratio for signals received from certain mobile stations is estimated. The estimated signal to interference ratio for the signals received from mobile stations are compared with a desired signal to interference ratio. When another connection set up in a cell or handoff of a connection to a cell is desirable, a check is done to find out whether there is available in the cell another possible mobile channel hopping scheme free from coincidence on every radio channel with every other mobile channel hopping scheme, already in use in the cell. If there is a possible mobile hopping scheme free from coincidence, the desired connection is established by set up or handoff using the possible mobile channel hopping scheme in the cell only if the estimated signal to interference ratio for signals received from certain mobile stations involved in connections equals or exceeds the desired ratio. These mobile stations would normally include all mobile stations involved in connections in the cell where the desired connection is established. Decisions whether to set up or handoff a connection in the cell may then be made by a base station for the cell or by a mobile switching centre. According to a preferred embodiment the certain mobile stations also include all mobile stations involved in a connection in a second cell adjacent to the cell where the desired connection is established or in any cell adjacent to the cell where the desired connection is established. Decisions whether to set up or handoff a desired connection in any of the adjacent cells may then be made by a base station controller for the base stations of the adjacent cells or by a mobile switching centre.

In combination with channel hopping, interleaving and error protective coding, fractional loading of base stations or cells is a means for controlling the co-channel interference. Thus, by forcing the load at each base station to be lowered, the C/I-constraint may be controlled, allowing unity cluster size, i.e. the total frequency band is reused at all base stations. As a result the cumbersome frequency planning commonly required in TDMA systems may be omitted.

Figure 8:
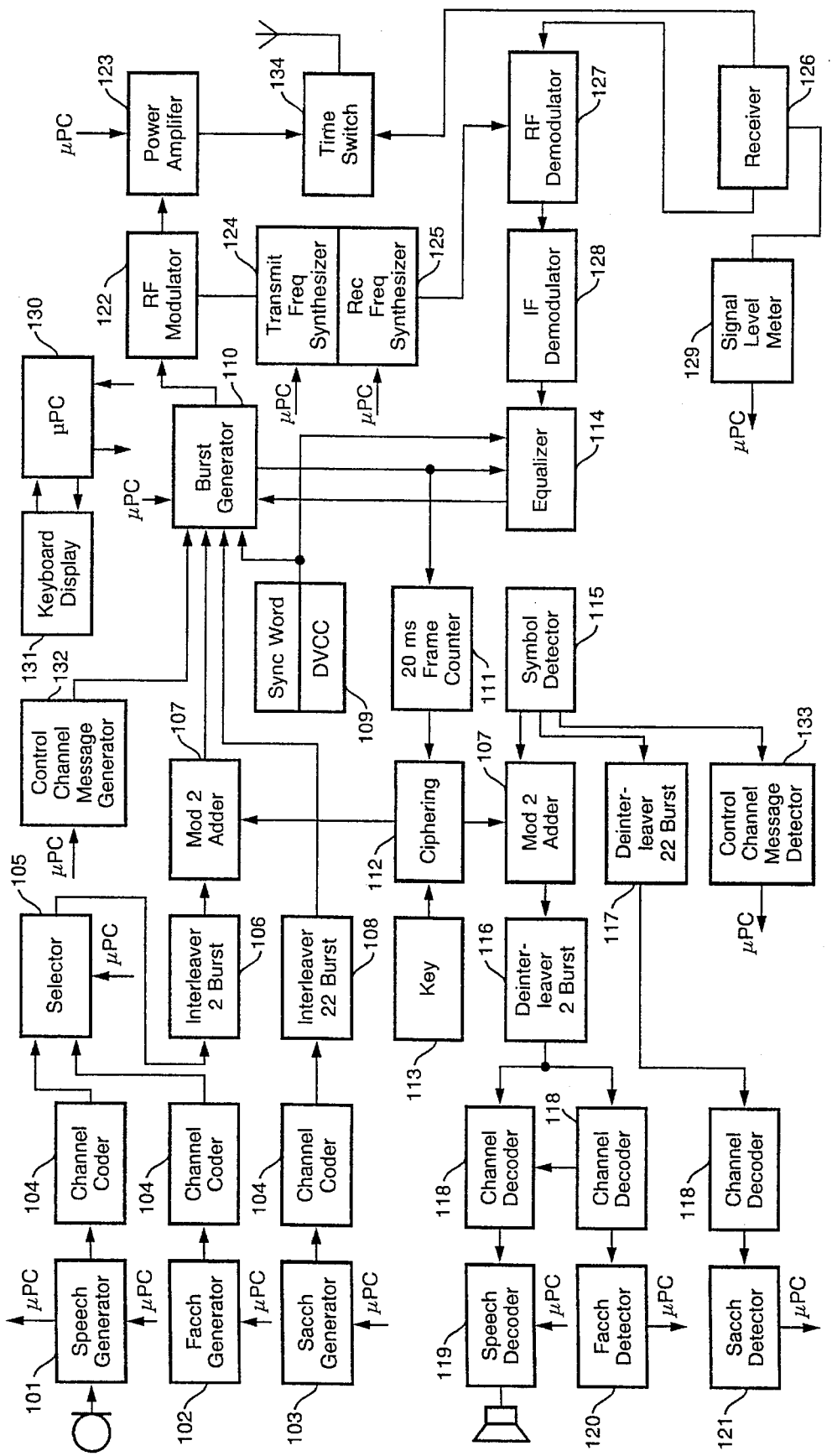
FIG. 8 shows a block diagram of a mobile station used for communication in a prior art TDMA system or a TDMA-FH system according to the invention.
Figure 9:
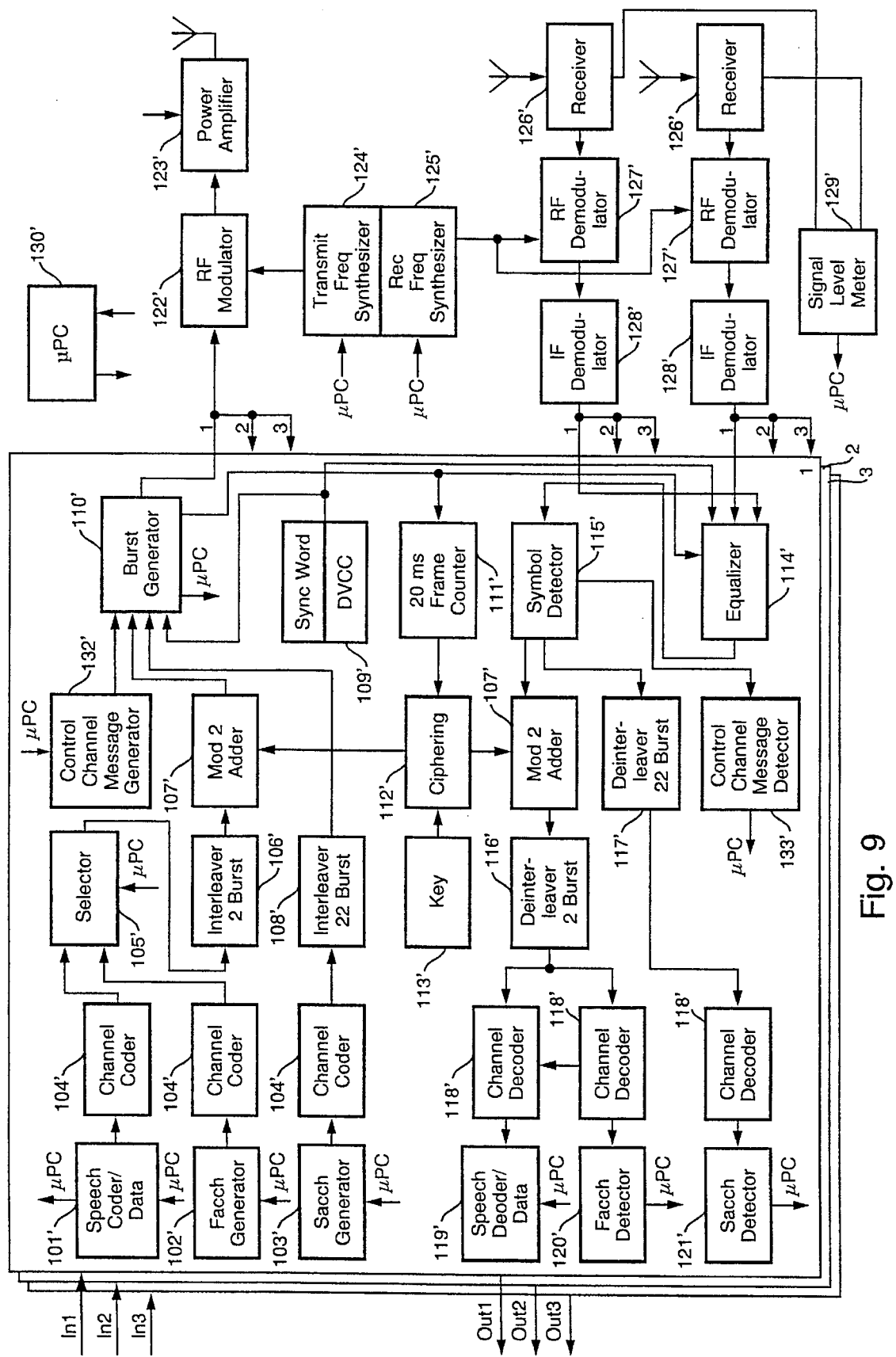
FIG. 9 shows a block diagram of a base station used for communication in a prior art TDMA system or a TDMA-FH system according to the invention.

FIGS. 8 and 9 are block diagrams of embodiments of a mobile station and a base station for communication on TDMA radio channels in a cellular mobile radio system. The base and mobile stations are designed for a system according to EIA/TIA IS-54 standards but also for transmission according to the invention in a TDMA system without analog traffic channels. Since communication on analog control channels may be done substantially according to standard and the invention relates to hopping between digital traffic channels, the part of the base and mobile stations used only for analog control channels and analog traffic channels according to EIA/TIA IS-54 are not illustrated.

Normally, a base station is designed for serving many mobiles, i.e. updating/monitoring and handling connections involving many mobile stations. However, in order to make a more eligible drawing, FIG. 9 illustrates an example including only parts of a base station for handling three simultaneous connections in different time slots. Thus the base station has only three channel controllers 1, 2, and 3, each of which handles one of three connections. Furthermore, the base station has only one RF modulator and power amplifier receiving bursts from the channel controllers. Normally a base station would have many RF modulators and power amplifiers, each modulator receiving bursts from up to as many channel controllers as there are time slots in a frame.

In FIGS. 8 and 9, the blocks of one base station controller corresponding to similar mobile station blocks are assigned the same reference number, but with an "'". A very brief description of purpose or operation of each block according to EIA/TIA IS-54 will be given first. Corresponding blocks are assumed to operate similarly unless otherwise mentioned.

A SPEECH CODER 101 in the mobile station converts the analog signal generated by a microphone subjected to the human voice, or data received from a data source (not shown) into a bit data stream, divided into data packages, according to the TDMA principle. The SPEECH/DATA CODER 101' in the base station converts incoming digital information into data packages of the same type as the SPEECH CODER 101 in the mobile station.

According to the EIS/TIA IS-54 standards there is a fast associated control channel, FACCH, and a slow associated control channel, SACCH. The FACCH generator 102' in the base station is used during the signaling of control and supervision messages to the mobile station. When preparing a handoff the base station may transmit on the FACCH radio channel time slot hopping information, e.g. similar to GSM or the identity of a hopping scheme, to be used by the mobile station for its connection after handoff. The FACCH generator 102 in the mobile is used by the mobile during the signaling of control and supervision messages. A FACCH message transmitted by a base or mobile in a time slot of a frame replaces the speech or data from that base or mobile in that frame.

The SACCH is a "continuous control channel" meaning that a fixed number (12) of bits is reserved for the SACCH in each burst relating to a connection. The SACCH GENERATOR 103' in the base station, is used by the base when exchanging signaling messages with the mobile. Before a handoff the base may transmit on the SACCH hopping information of a kind described later, e.g. according to GSM or the identity of a radio channel and time slot hopping scheme, to be used by the mobile for the connection after handoff. The SACCH GENERATOR 103 in the mobile station is used by the mobile when exchanging signaling messages with the base.

There is a CHANNEL CODER 104 and 104' connected to each of blocks 101, 101' etc to 103'. A CHANNEL CODER manipulates the incoming data in order to make error detection and correction possible. The mechanisms used are convolutional encoding for protecting important data bits in the speech code and cyclic redundancy check, CRC, where the perceptually significant bits in the speech coder frame, e.g. 12 bits, are used for computing a 7-bit check.

A SELECTOR 105 is connected to the CHANNEL DECODER 104 associated with the SPEECH CODER and FACCH GENERATOR. The SELECTOR 105 is controlled by the MICROPROCESSOR CONTROLLER 130 so that, at appropriate times, user information over a particular connection is replaced with messages over the FACCH.

The 2 BURST INTERLEAVER 106 interleaves data either from the speech coder 101 or from the FACCH generator 102 over two time slots. The 260 data bits, which constitute one transmitting word, are divided into two equal parts and allotted two consecutive time slots. The effects of Rayleigh fading will be reduced in this way.

The output of the 2 BURST INTERLEAVER 106 is connected to the input of a MOD 2 ADDER 107 so that transmitted data is ciphered, bit by bit, by logical modulo-two-addition of a pseudo-random bit-stream.

Data transmitted over SACCH interleaved by the INTERLEAVER 22 BURST 106 over 22 time slots, each consisting of 12 bits of information. Two SACCH messages are interleaved in parallel i.e. the second message is delayed 11 bursts compared to the first, according to the diagonal principle.

The SYNC WORD DVCC 109 is a store for sync words and digital verification colour codes, DVCC. A 28 bit synchronization word is used for time slot synchronization and identification and also for equalizer training. Different slot identifiers are defined, one for each time slot, and another three are reserved for future development. The DVCC is an 8-bit code which is sent by the base to the mobile and vice-versa. The DVCC is used for assuring that the right radio channel is decoded.

Depending on the state of operation, two kinds of bursts are generated by the base station BURST GENERATOR 110'. The voice/traffic channel burst is configured by integrating 260 bits DATA, 12 bits SACCH, 28 bits SYNC, 12 bits Coded DVCC and 12 delimiter bits according to the time slot format specified by EIA/TIA IS-54. In a control channel burst, DATA and SACCH are replaced with data generated by the CONTROL CHANNEL MESSAGE GENERATOR 132'. The transmission of a burst in a time slot of a radio channel is synchronized with the transmission of bursts in the other two time slots, if any.

Depending on the state of operation, two kinds of bursts are generated by the mobile station BURST GENERATOR 110. The voice/traffic channel burst is configured by integrating 260 bits DATA, 12 bits SACCH, 28 bits SYNC, 12 bits Coded DVCC and 12 delimiter bits according to the time slot format specified by EIA/TIA IS-54.

Three full rate time slots make up one frame. The 20 mS FRAME COUNTER 111 updates the ciphering code every 20 ms, i.e. once for every transmitted frame. A pseudo random algorithm is used for ciphering. The CIPHERING 112 is controlled by a key unique for each subscriber. KEY 113 comprises a sequencer for updating the ciphering code.

In order to cope with multipath propagation etc., causing time dispersion, an adaptive equalization method is provided by the EQUALIZER 114' in the base station, to improve signal quality. Synchronization with the BURST GENERATOR 110' is provided in order to find the time slot associated with the right received channel. A correlation in the equalizer adjusts to the timing of the received bit stream. Syncword and DVCC are checked for identification reasons.

The mobile station also has an EQUALIZER 114, providing an adaptive equalization method to improve signal quality. A correlation in the equalizer adjusts to the timing of the received bit stream. The base station is the master and the mobile station is the slave regarding frame timing. The mobile station equalizer finds the incoming timing and synchronizes the burst generator. Syncword and DVCC are checked for identification reasons.

The RF MODULATOR 122 modulates the carrier frequency from the TRANSMITTING FREQUENCY SYN- THESIZER 124 according to the pi/4-DQPSK method (pi/4 shifted, Differentially encoded Quadrature Phase Shift Keying). This technique implies that information is differentially encoded, i.e. 2 bit symbols are transmitted as four possible changes in phase; +/−pi/4 and +/−3pi/4.

The POWER AMPLIFIER 123 amplifies the signals from the RF MODULATOR 122. The RF power emission level is selected on command by the MICRO PROCESSOR CONTROLLER 130.

The TRANSMITTING FREQUENCY SYNTHESIZER 124' in the base station generates the transmitter carrier frequency in accordance with commands from the μPC 130'. When radio channel hopping is implemented, the micro processor μPC 130' calculates or reads which radio channel is to be used for each burst in accordance with hopping information stored in a microprocessor store and the hopping information transmitted to the mobile station intended to receive the burst. The micro processor μPC 130' then sends timed instructions to the TRANSMITTER SYNTHESIZER 124 to generate a sequence of carrier frequencies in accordance with the frequency hopping sequence or scheme to be used.

The TRANSMITTING FREQUENCY SYNTHESIZER 124 in the mobile station generates the transmitter carrier frequency in accordance with commands from the the μPC 130. When radio channel hopping is implemented the μPC 130 reads or calculates a sequence of radio channels to be used in accordance with the selected radio channel time slot hopping information received from the base station on either the control channel during call setup or on one of the associated control channels during a handoff. The μPC 130 sends timed commands regarding the desired radio channel to the SYNTHESIZER.

The RECEIVING FREQUENCY SYNTHESIZER 125' in the base station generates the receiver carrier frequency in accordance with commands from the micro processor μPC 130'. The microprocessor determines which receiver carrier is to be used for which time slot in accordance with hopping information stored in a microprocessor store, e.g. according to a radio channel time slot hopping scheme, and sends timed instructions to the SYNTHESIZER 125'.

In the mobile station the RECEIVING FREQUENCY SYNTHESIZER 125 generates the receiver carrier frequency in accordance with the instructions from the micro processor μPC 130. The appropriate radio channel being read or calculated by μPC 130 in accordance with a radio channel time slot hopping scheme or other hopping information is received from the base station on either the control channel during call setup or on one of the associated control-channels during a handoff.

Radio signals from antennas are received by a RECEIVER 126 in the mobile station and a separate RECEIVER 126' for each antenna in the base station. The radio frequency carrier from a RECEIVER is demodulated in an RF DEMODULATOR 127 or 127' generating an intermediate frequency. In the IF DEMODULATOR 128 the intermediate frequency signal is demodulated, restoring the original pi/4-DQPSK-modulated digital information. The received signal strength is measured by the SIGNAL LEVEL METER 129 and the value is sent to the micro processor controller 130.

The SYMBOL DETECTOR 115 converts the received 2-bit symbol format from the EQUALIZER 114 to a single bit data stream. The DEINTERLEAVER 2 BURST 116 reconstructs the speech/FACCH data from the MOD 2 ADDER 107 by assembling and rearranging information from two consecutive frames. SACCH data, which is spread over 22 consecutive frames, is reassembled and rearranged by the DEINTERLEAVER 22 BURST 117.

The convolutionally encoded data from a DEINTERLEAVER is decoded by CHANNEL DECODER 118 using the reversed principle of coding. The received cyclic redundancy check, CRC, bits are checked to determine if any error has occured. The CHANNEL DECODER 118 for the FACCH furthermore detects the distinction between speech channel and FACCH information and directs the decoders accordingly.

The SPEECH DECODER 119 processes the received data in accordance with the speech coder algorithm, VSELP, and generates the received speech signal. The analog signal is finally enhanced by a filtering technique. The FACCH DETECTOR 120 detects messages on the fast associated control channel and transfers the information to the MICRO PROCESSOR CONTROLLER 130. During a handoff, the MS may receive the identity of the hopping patterns to be used in the next connection on this channel.

Messages on the Slow Associated Control Channel are detected by the SACCH DETECTOR 121 and the information is transferred to the MICRO PROCESSOR CONTROLLER 130. During a handoff the mobile station may on this channel receive the identity of the shifting schemes to be used in the next connection.

The radio base station activity and the mobile station communication is controlled by the MICRO PROCESSOR CONTROLLER 130' in the base station. Decisions are made in accordance with received messages and measurements made. When hopping is implemented a sequence of combinations of a radio channel and a time slot channel shifting scheme are determined for each of the transmission directions for each mobile station served and involved in a connection.

The mobile station activity and the base station communication is controlled by the mobile station MICRO PROCESSOR CONTROLLER 130, which also handles the terminal KEYBOARD DISPLAY 131 input and output. Decisions are made in accordance with received messages and measurements made. For each time slot, the transmitter and receiver radio channels will be determined according to the hopping information received and information stored in a microprocessor store. The mobile station KEYBOARD DISPLAY 131 performs the information exchange between the user and the base station.

The CHANNEL MESSAGE GENERATOR 132 generates control channel messages according to orders received from the micro processor controller 130. The CONTROL CHANNEL MESSAGE DETECTOR 133 detects received control channel messages and sends them to the MICRO PROCESSOR CONTROLLER 130.

The TIME SWITCH 134 in the mobile station connects either the transmitter or the receiver to the MS antenna. The timing is synchronized to the receiving and transmitting sequence by the MICRO PROCESSOR CONTROLLER 130.

A tight power control algorithm may be used to reduce the transmitter power on the radio channels in the connections with mobiles located close to the base station. In this way the interference from these connections to other connections will also be reduced, which in turn will give increased capacity. From a pure capacity point of view, the best thing would be to reduce the transmitter power levels to a minimum. However, the reduction in the transmit power level should be a compromise between the reduced signal quality and the resulting increase in capacity.

The base station can decide if a mobile shall lower its power by measuring the quality of the received signals relating to the connection with the mobile. Such quality measurements can be measures of the signal strength, C/I and the bit error rate. The measurements made, may be translated into a power control command in several different ways. One example could be to compare one of the quality measurements to a desired value and order a decrease in the mobile transmit power if the measured value is above the desired value. If the measured value is below the desired value a command to increase the mobile transmit power may be transmitted. The power control command may be transmitted on either the SACCH channel or the FACCH channel.

The quality measurements of the signals transmitted from the base must be based on measurements in the mobile. Several methods exist for utilizing these measurements for base station power control. One example is that the mobile transmits all measurements directly, on either SACCH or FACCH, to the base station, which in turn evaluates the measurements and adjusts its transmit power according to a given criteria. Another example is that the mobile itself evaluates the measurements and transfers a request for an increase or decrease of the base transmit power. It is probably desirable that the base station, in any case, makes the actual decisions of whether to increase the base station transmit power levels.

To speed up the power control of the mobiles, it may be permitted to let the mobiles take a more active part in the decision of their own transmit power levels. By measuring the quality of the signals received from the base station, the mobile can predict the quality of its own transmitted signals when received at the base. Thus, if the mobile detects a sudden improvement or degradation of the quality of the signal transmitted from the base, it may decide to raise its power level. It is important, however, that the base station has the ability to make a fast re-adjustment of the mobile transmit power level in order to minimize the risk of a mobile unintentionally performing a dramatic increase or decrease of its power level.

When implementing methods for communication according to the present invention in some TDMA mobile radio communication system, e.g. according to GSM or IS-54, normally only minor amendments may be necessary. Much of the procedures for call set up and termination and handoff may be similar to those in a conventional TDMA system. Some amendments are necessary. At call set up or handoff of a call previously set up, the base station in a prior art TDMA system, without channel hopping, informs the mobile station of a fixed radio channel and a fixed time slot to be used for the call to be set up or handed over. When using channel hopping according to the present invention, some other method of synchronizing the transmitter and receiver to the right time slot of the right radio channel is required for the communication to be possible. Most connections are bidirectional, e.g. normal telephone calls and data communications. Both base and mobile stations must therefore not only transmit, but also receive radio signals in the right time slot of the right radio channel. Normally the base station will send radio channel and time slot hopping information to the mobile station. In a TDMA-FH system with channel hopping the hopping information is then sent instead of information on a fixed time slot on a fixed radio channel.

When implementing the present invention in a cellular TDMA mobile radio system designed for optional channel hopping, e.g. GSM, even less modifications are normally required. One fundamental difference between the GSM system and a TDMA-FH system according to the present invention is that no frequency plan is required in a system according to the present invention. However, this fundamental difference does not exclude the possibility that a method of determining radio channels and time slots according to GSM can also be used in a system according to the present invention with few modifications.

According to the random frequency hopping mode in GSM, a mobile and base station transmit their bursts in time slots of a sequence of radio channels that the station derives from an algorithm. The radio channel hopping sequences are orthogonal inside one cell, meaning that no collisions occur between communications in the same cell. The radio channel hopping sequences are independent from one cell to another.

The hopping sequences are generated dependent on three different parameters:

a) The set of radio channels to be hopped on
b) The hopping seed of the cell, which allows different sequences in adjacent or neighbouring cells
c) The index offset, to distinguish the different connections of the cell using the same set of radio channels to be hopped on Thus, according to GSM, the radio channel and time slot hopping information sent from the base to the mobile is the set of frequencies, the hopping seed and the index offset.

In each base and mobile station an algorithm is stored. Inputs to the algorithm are a set of numbers and a seed. Depending upon the seed, the algorithm generates a sequence of numbers selected among the set of numbers. Only numbers from the set are generated. Different seeds cause the algorithm to generate different sequences. Irrespective of the seed, in any long sequence generated by the algorithm any number in the set appears substantially as frequently as any other number in the set. Thus, for those not informed of the seed, the numbers in the set appear to be selected at random. The sequence generated repeats itself after some time. The length of the sequence depends upon the algorithm used, and can be made longer than the average duration of a telephone call.

Mobiles served by the same cell (base station) receive the same seed, and using the same algorithm, they generate identical sequences. However, different mobiles served by the same cell receive different index offsets in their hopping information from the base station. Each mobile station adds their individual index offset to the number generated by the algorithm, whereby the mobile stations will get different numbers.

Assuming the set includes N radio channels which are given individual numbers 0, 1, ... N–1, µPC 130 inputs the seed and the number N in the algorithm and starts executing the algorithm. A sequence of numbers, none exceeding N–1 are then generated. To each number generated by the algorithm the µPC 130 adds the index offset modulo N. The number obtained by this addition is the number of the next radio channel to be used.

As an illustrative example say that the set includes N=8 radio channels that the station may hop to. The random generator could then generate a sequence 2,6,4,0,3,1,6, ... for a given hopping seed. The following eight different hopping sequences for eight different connections in the same cell could then be obtained.

| Index offset | hopping scheme |
|---|---|
| 0 | 2,6,4,0,3,1,6,... |
| 1 | 3,7,5,1,4,2,7,... |

-continued

| Index offset | hopping scheme |
| --- | --- |
| 2 | 4,0,6,2,5,3,0,... |
| 3 | 5,1,7,3,6,4,1,... |
| 4 | 6,2,0,4,7,5,2,... |
| 5 | 7,3,1,5,0,6,3,... |
| 6 | 0,4,2,6,1,7,4,... |
| 7 | 1,5,3,7,2,0,5,... |

Comparing the eight sequences shows all radio channels are used simultaneously but no sequence coincides with any other sequence, i.e. no two mobiles hop to the same radio channel at the same time.

According to GSM there should be a frequency plan. The set of radio channels sent to a mobile served by one cell is therefore different from all sets of radio channels sent to any mobile served by an adjacent cell or another cell in the same cell cluster. None of the radio channels included in any set sent to a mobile station served by one cell is included in any set sent to any mobile station served by another cell in the same cell cluster.

If radio channels in a TDMA-FH according to the present invention would be determined in a way similar to the way in GSM, using radio channel sets, seed, index offset and an algorithm, at least some of the radio channels included in the set sent to a mobile in one cell would also be included in the set sent to a mobile in an adjacent cell. Preferably the majority, if not all, of the radio channels included in any set sent to any mobile in one cell would also be included in sets sent to mobiles in adjacent cells.

The invention is not limited to embodiments where the time slots and radio channels of hopping sequences are determined by the channel set, hopping seed and index offset according to GSM. However, according to the invention hopping shall normally meet at least the following rules:

1) hopping sequences/schemes for connections involving mobiles in the same cell or, expressed somewhat differently, bursts transmitted from mobiles served by the same base station, must not coincide in the same time slot of the same radio channel.

2) hopping schemes/sequences for connections involving mobiles in adjacent cells, or expressed somewhat differently, for mobiles served by adjacent base stations, may only coincide occasionally and shall be uncorrelated or have low correlation with each other.

In a system similar to IS-54 the hopping information may be transmitted from the base station to the mobile station on the control channel during the setup of a call, or on one of the associated control channels, FACCH or SACCH, during a handoff. Most connections are bidirectional, e.g. normal telephone calls and data communications. The hopping information may therefore indicate both radio channel and time slot combinations to be used for the sequences of bursts of radio signals to be transmitted by the base and mobile stations for the purpose of forwarding speech or other information relating to the connection. Instead of specifying complete sequences, the hopping information from a base may be an identification number or code of a scheme or an algorithm stored in all base and mobile stations. The hopping information from a base station may also indicate where in the scheme the mobile should start if it should not start at the beginning of the scheme.

An algorithm or a scheme has normally a finite length, i.e. includes or generates only a finite number of radio channel/time slot combinations. Normally a call lasts for so-long that the number of radio signal bursts transmitted from the mobile station, for the purpose of forwarding the information relating to the call, exceeds the length of the scheme. However, a base or mobile station may use the hopping information for hopping cyclically. When the station has transmitted a burst in accordance with the last combination of radio channel and time slot indicated at the end of the scheme or generated by an algorithm, the mobile transmits its next burst in the combination of radio channel and time slot indicated first in the scheme.

According to one embodiment schemes used by mobile stations in a cell are synchronized by a base station for the cell and are cyclical permutations of a basic scheme. As an example it is assumed there are 13 radio channels available for connections. Four basic scheme cycles for four neighbour cells may then be as follows.

A': 1,4,7,10,13,3,6,9,12,2,5,8,11
B': 1,6,11,3,8,13,5,10,2,7,12,4,9
C': 1,8,2,9,3,10,4,11,5,12,6,13,7
D': 1,12,10,8,6,4,2,13,11,9,7,5,3

In a first cell a mobile may transmit according to one of the following synchronized cyclic schemes A01' to A12' obtained by cyclic permutation of the basic scheme cycle A'.

A01'
 1;4;7;10;13;3;6;9;12;2;5;8;11;1;4;7;10;13;3;6;9;12;2;5;8;11;
A02'
 2;5;8;11;1;4;7;10;13;3;6;9;12;2;5;8;11;1;4;7;10;13;3;6;9;12;
A03' 3;6;9;12;2;5;8;11;1;4;7;10;13;3;6;9;12;2;5;8;11;1;4;7;10;13;
A04'
 4;7;10;13;3;6;9;12;2;5;8;11;1;4;7;10;13;3;6;9;12;2;5;8;11;1;
A05'
 5;8;11;1;4;7;10;13;3;6;9;12;2;5;8;11;1;4;7;10;13;3;6;9;12;2;
A06'
 6;9;12;2;5;8;11;1;4;7;10;13;3;6;9;12;2;5;8;11;1;4;7;10;13;3;
A07'
 7;10;13;3;6;9;12;2;5;8;11;1;4;7;10;13;3;6;9;12;2;5;8;11;1;4;
A08'
 8;11;1;4;7;10;13;3;6;9;12;2;5;8;11;1;4;7;10;13;3;6;9;12;2;5;
A09'
 9;12;2;5;8;11;1;4;7;10;13;3;6;9;12;2;5;8;11;1;4;7;10;13;3;6;
A10'
 10;13;3;6;9;12;2;5;8;11;1;4;7;10;13;3;6;9;12;2;5;8;11;1;4;7;
A11'
 11;1;4;7;10;13;3;6;9;12;2;5;8;11;1;4;7;10;13;3;6;9;12;2;5;8;
A12'
 12;2;5;8;11;1;4;7;10;13;3;6;9;12;2;5;8;11;1;4;7;10;13;3;6;9;
A13'
 13;3;6;9;12;2;5;8;11;1;4;7;10;13;3;6;9;12;2;5;8;11;1;4;7;10;

In a second cell adjacent to the first cell a mobile may transmit according to one of the following synchronized cyclic schemes B01' to B12' obtained by cyclic permutation of the basic scheme cycle B'.

B01'
 1;6;11;3;8;13;5;10;2;7;12;4;9;1;6;11;3;8;13;5;10;2;7;12;4;9;
B02'
 2;7;12;4;9;1;6;11;3;8;13;5;10;2;7;12;4;9;1;6;11;3;8;13;5;10;

B03'
 3;8;13;5;10;2;7;12;4;9;1;6;11;3;8;13;5;10;2;7;12;4;9;1; 6;11;
B04'
 4;9;1;6;11;3;8;13;5;10;2;7;12;4;9;1;6;11;3;8;13;5;10;2;7; 12;
B05'
 5;10;2;7;12;4;9;1;6;11;3;8;13;5;10;2;7;12;4;9;1;6;11;3;8; 13;
B06'
 6;11;3;8;13;5;10;2;7;12;4;9;1;6;11;3;8;13;5;10;2;7;12;4; 9;1;
B07'
 7;12;4;9;1;6;11;3;8;13;5;10;2;7;12;4;9;1;6;11;3;8;13;5; 10;2;
B08'
 8;13;5;10;2;7;12;4;9;1;6;11;3;8;13;5;10;2;7;12;4;9;1;6; 11;3;
B09'
 9;1;6;11;3;8;13;5;10;2;7;12;4;9;1;6;11;3;8;13;5;10;2;7; 12;4;
B10'
 10;2;7;12;4;9;1;6;11;3;8;13;5;10;2;7;12;4;9;1;6;11;3;8; 13;5;
B11'
 11;3;8;13;5;10;2;7;12;4;9;1;6;11;3;8;13;5;10;2;7;12;4;9; 1;6;
B12'
 12;4;9;1;6;11;3;8;13;5;10;2;7;12;4;9;1;6;11;3;8;13;5;10; 2;7;
B13'
 13;5;10;2;7;12;4;9;1;6;11;3;8;13;5;10;2;7;12;4;9;1;6;11; 3;8;

In a third cell adjacent to the first cell a mobile may transmit according to one of the following synchronized cyclic schemes C01' to C12' obtained by cyclic permutation of the basic scheme cycle C'.

C01'
 1;8;2;9;3;10;4;11;5;12;6;13;7;1;8;2;9;3;10;4;11;5;12;6; 13;7;
C02'
 2;9;3;10;4;11;5;12;6;13;7;1;8;2;9;3;10;4;11;5;12;6;13;7; 1;8;
C03'
 3;10;4;11;5;12;6;13;7;1;8;2;9;3;10;4;11;5;12;6;13;7;1;8; 2;9;
C04'
 4;11;5;12;6;13;7;1;8;2;9;3;10;4;11;5;12;6;13;7;1;8;2;9; 3;10;
C05'
 5;12;6;13;7;1;8;2;9;3;10;4;11;5;12;6;13;7;1;8;2;9;3;10;4; 11;
C06'
 6;13;7;1;8;2;9;3;10;4;11;5;12;6;13;7;1;8;2;9;3;10;4;11;5; 12;
C07'
 7;1;8;2;9;3;10;4;11;5;12;6;13;7;1;8;2;9;3;10;4;11;5;12;6; 13;
C08'
 8;2;9;3;10;4;11;5;12;6;13;7;1;8;2;9;3;10;4;11;5;12;6;13; 7;1;
C09'
 9;3;10;4;11;5;12;6;13;7;1;8;2;9;3;10;4;11;5;12;6;13;7;1; 8;2;
C10'
 10;4;11;5;12;6;13;7;1;8;2;9;3;10;4;11;5;12;6;13;7;1;8;2; 9;3;
C11'
 11;5;12;6;13;7;1;8;2;9;3;10;4;11;5;12;6;13;7;1;8;2;9;3; 10;4;
C12'
 12;6;13;7;1;8;2;9;3;10;4;11;5;12;6;13;7;1;8;2;9;3;10;4; 11;5;
C13'
 13;7;1;8;2;9;3;10;4;11;5;12;6;13;7;1;8;2;9;3;10;4;11;5; 12;6;

In a fourth cell adjacent to the first cell a mobile may transmit according to one of the following synchronized cyclic schemes D01' to D12' obtained by cyclic permutation of the basic scheme cycle D'.

D01'
 1;12;10;8;6;4;2;13;11;9;7;5;3;1;12;10;8;6;4;2;13;11;9;7; 5;3;
D02'
 2;13;11;9;7;5;3;1;12;10;8;6;4;2;13;11;9;7;5;3;1;12;10;8; 6;4;
D03'
 3;1;12;10;8;6;4;2;13;11;9;7;5;3;1;12;10;8;6;4;2;13;11;9; 7;5;
D04'
 4;2;13;11;9;7;5;3;1;12;10;8;6;4;2;13;11;9;7;5;3;1;12;10; 8;6;
D05'
 5;3;1;12;10;8;6;4;2;13;11;9;7;5;3;1;12;10;8;6;4;2;13;11; 9;7;
D06'
 6;4;2;13;11;9;7;5;3;1;12;10;8;6;4;2;13;11;9;7;5;3;1;12; 10;8;
D07'
 7;5;3;1;12;10;8;6;4;2;13;11;9;7;5;3;1;12;10;8;6;4;2;13; 11;9;
D08'
 8;6;4;2;13;11;9;7;5;3;1;12;10;8;6;4;2;13;11;9;7;5;3;1;12; 10;
D09' 9;7;5;3;1;12;10;8;6;4;2;13;11;9;7;5;3;1;12;10;8;6;4;2; 13;11;
D10'
 10;8;6;4;2;13;11;9;7;5;3;1;12;10;8;6;4;2;13;11;9;7;5;3;1; 12;
D11'
 11;9;7;5;3;1;12;10;8;6;4;2;13;11;9;7;5;3;1;12;10;8;6;4;2; 13;
D12'
 12;10;8;6;4;2;13;11;9;7;5;3;1;12;10;8;6;4;2;13;11;9;7;5; 3;1;
D13'
 13;11;9;7;5;3;1;12;10;8;6;4;2;13;11;9;7;5;3;1;12;10;8;6; 4;2;

A study of the schemes A01' to D13' reveals that any two schemes in adjacent cells coincide once but not more during one cycle of a scheme. Assuming there are m time slots in a frame on a channel, m mobiles in the first cell may use the same scheme, e.g. A07', without any coincidence of bursts transmitted from other mobiles in the same cell provided they transmit in different time slots. Thus up to maximum of 13×m mobiles in the first cell may transmit according to the schemes A01' to A13' without co-channel interference from other mobiles in the same cell. Since there were 13 radio channels available in the first cell, the maximum number equals the total number of time slots available on all radio channels in the cell. The same is true for each of the second, third and fourth cells.

The basic schemes may be assigned to 3-cell clusters or 4-cell clusters in a way similar to a frequency plan in order to reduce co-channel interference from mobiles in different cells. However there is an inherent fundamental difference between assigning basic schemes like A' to D' and assigning radio channels to cell clusters according to a fixed frequency plan. When assigning schemes according to the invention each cell is still entitled to use every radio channel for connections. Thus when assigning such schemes the maximum connection handling capacity for any cell is not reduced compared to a situation when no schemes are assigned. Using the schemes, and having a base station in a cell with enough transceivers means the cell can actually handle as many simultaneous connections as the total number of time slots on all the radio channels available and there is no co-channel interference from mobiles in the same cell. Using proper schemes means all co-channel interference comes from adjacent cells and surrounding more distant cells whereby the connection handling capacity of a cell becomes dependent upon the number of simultaneous connections in adjacent and other more distant surrounding cells. Using the schemes means any two mobiles in adjacent cells can cause co-channel interference to each other only during a small minority of the bursts transmitted. This is an advantage in certain situations, e.g. when the power control of a mobile is not good enough. Comparing any two schemes A01' to D13' reveals that any two schemes for different cells, e.g. A03' and C07', have low correlation to each other but any two schemes for the same cell, e.g. B02' and B06', have high correlation to each other.

In the embodiment of a system illustrated in FIGS. 2, 8 and 9 in accordance with the EIA/TIA IS-54 standards, the control channels are analog and base and mobile stations do not transmit bursts in time slots on the control channels according to the TDMA principle. In a future development of a system according to EIA/TIA IS-54 the control channels could also become digital channels, divided in time slots where base and mobile stations transmit bursts, possibly according to channel shifting schemes.

Figure 10:
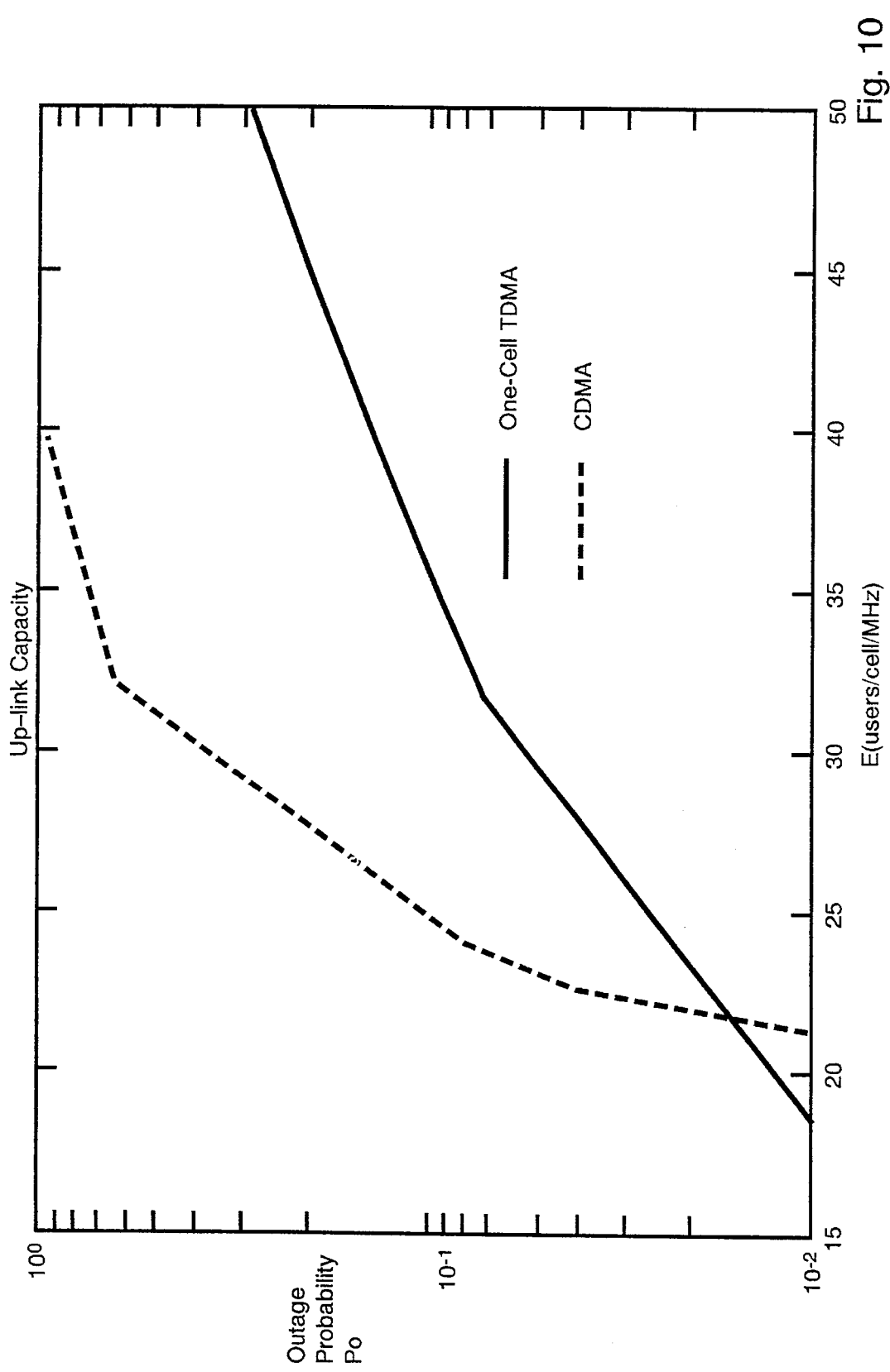
FIG. 10 illustrates a comparison of degrading quality in a CDMA system and a comparable TDMA-FH system according to the invention.

FIG. 10 illustrates how the quality may be degraded in a TDMA system, without a fixed frequency plan and implemented methods according to the invention, compared to a CDMA system as the number of subscribers served by the system is increased. The curves are based on simulations of two such systems under equivalent conditions. As seen, the quality is expected to degrade more slowly for the TDMA system according to the invention, which illustrates that a "softer" capacity may be obtained in such a TDMA system than in the CDMA system.

The reason that TDMA-FH with communication methods according to the invention performs better when overloading the system is that the channels connected to the same base station are separated in time/frequency while in CDMA systems they interfere with each other. Adding one more subscriber in such a TDMA system will not increase the interference for any other subscriber connected to the same base station. Only subscribers connected to surrounding base stations will suffer from the increased interference level. Since the interference produced by the additional subscribers will be reduced by the path-loss to the neighbouring cells, the resulting increase in co-channel interference for these cells will be small.

In the CDMA systems, one additional subscriber will degrade the quality for all subscribers in the system. In particular, one additional subscriber in the CDMA system will cause an increase of the interference level in its own cell where the path-loss is normally small compared to the path-loss to neighbouring cells.

The above phenomena also explains why the TDMA system will provide a geographically more flexible sharing of the radio resources than a CDMA system when a capacity peak is required in one or several of the cells.

Figure 11:
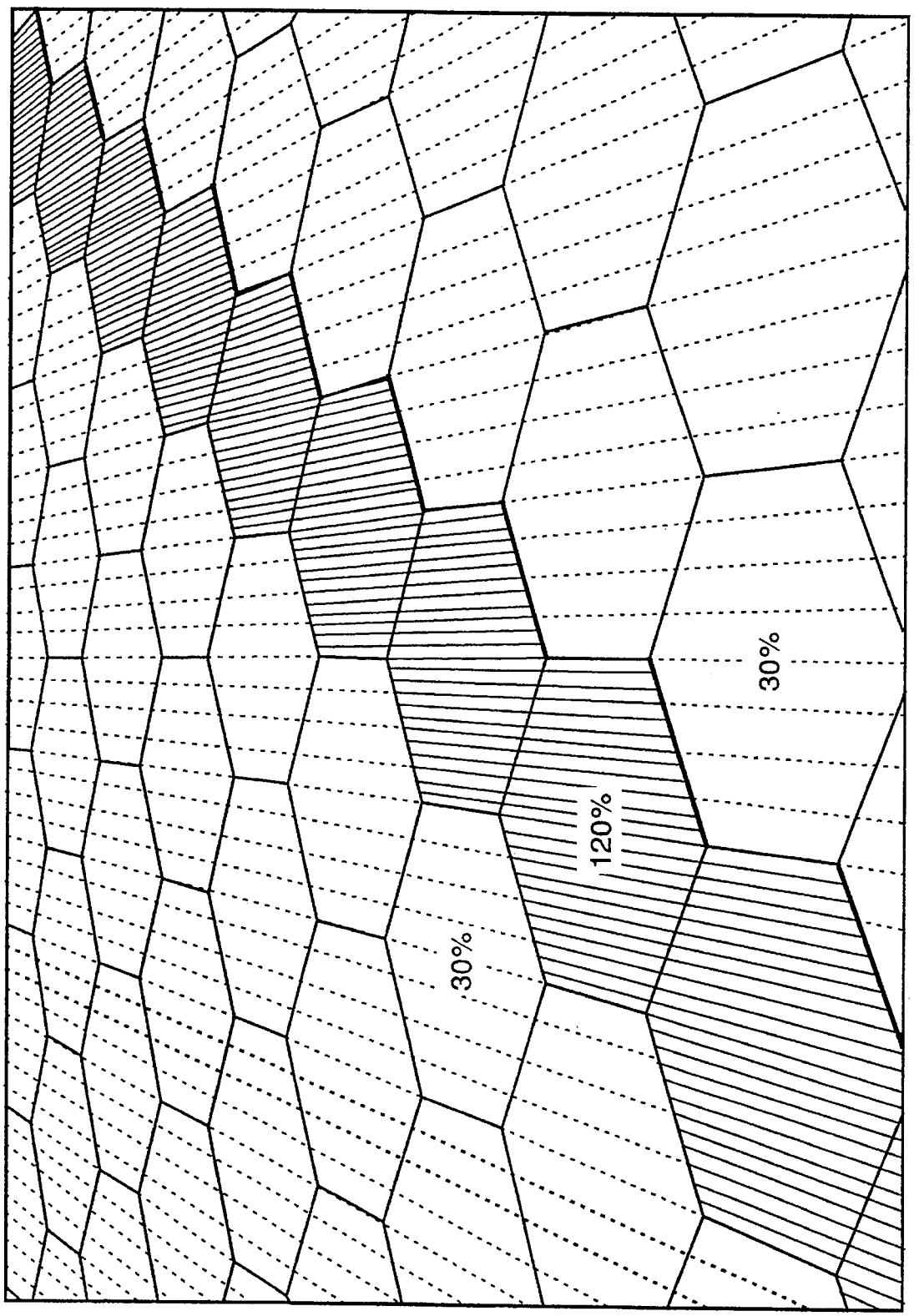
FIGS. 11 and 12 illustrate the ability of comparable CDMA and TDMA-FH systems to increase the capacity of certain cells if the capacity is reduced in other cells.
Figure 12:
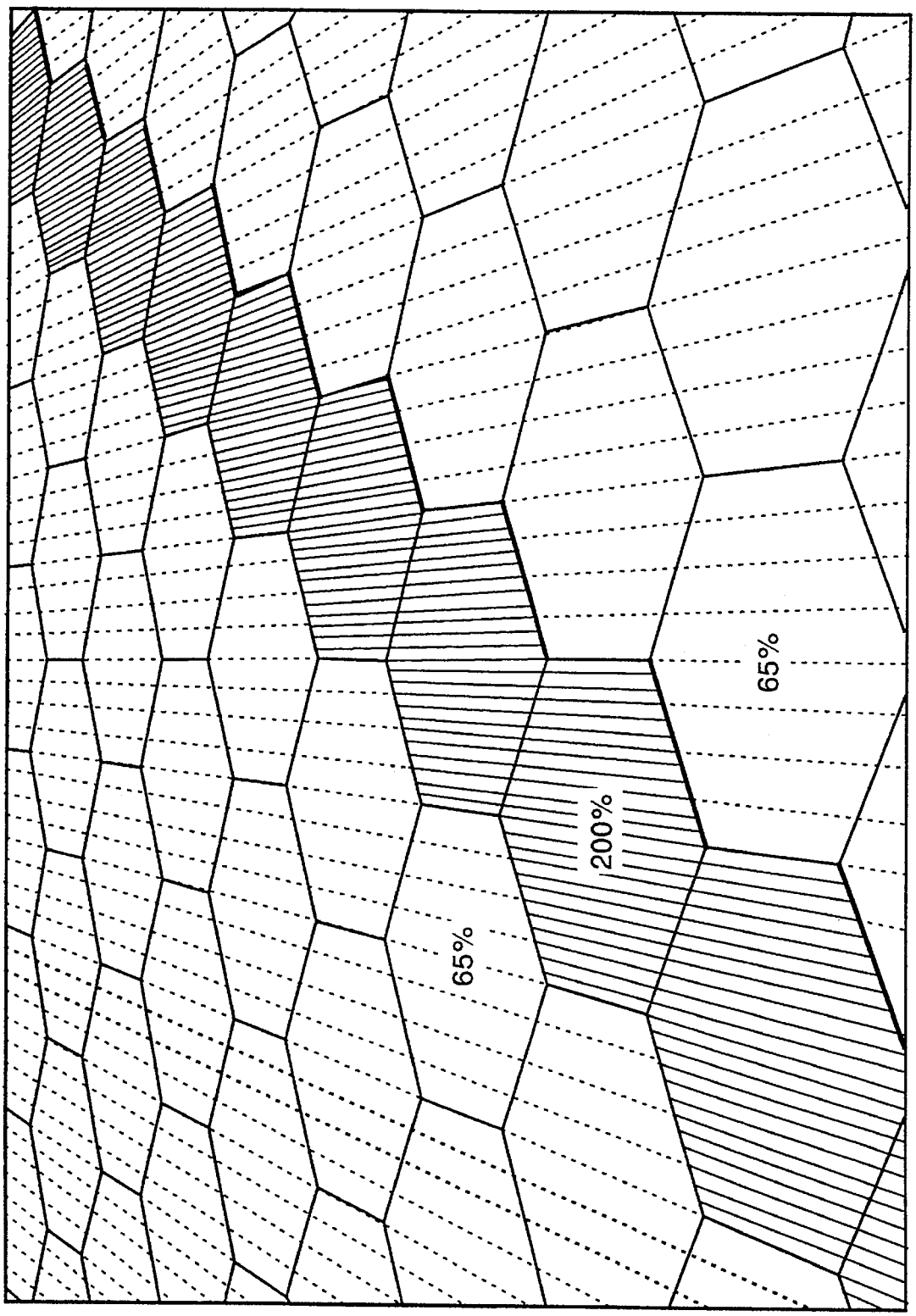

FIGS. 11 and 12 show how the connection handling capacity for each of certain cells, e.g. along a free-way during rush-hour, can be increased at the expense of a capacity reduction in the surrounding cells. The figures are based on simulations of a TDMA-system according to the invention and a CDMA system under equivalent conditions. As seen in FIG. 11, the CDMA system may increase the capacity to 120% along a line of cells if the capacity in all surrounding cells is reduced to 30%. In the system according to the invention the capacity may be increased to 200% along the line of cells if the capacity of the surrounding cells is reduced to 65%, as illustrated by FIG. 12.

Although the invention has been explained in connection with certain embodiments of TDMA cellular mobile radio systems, the invention is not limited to such embodiments of systems but may be implemented in other cellular mobile radio communication systems within the scope of the invention.

We claim:

1. A method for transmitting radio signals in a time division multiple access (TDMA) radiocommunication system comprising the steps of:

providing first and second cells adjacent one another, each cell having respective first and second base stations;

allocating a first set and a second set of TDMA radio channels for usage by said first and second base stations, respectively, said first and second sets including substantially the same channels, said channels including timeslots organized into frames;

transmitting radio signals from said first base station, on no more than a maximum number of said timeslots in each frame, said maximum number being less than a total number of available timeslots assigned to said first set of radio channels; and transmitting radio signals from said second base station, on no more than said maximum number of said timeslots in each frame.

2. The method of claim 1, wherein said maximum number of timeslots is equal to 60 percent of the available timeslots assigned to said first set of channels.

3. A TDMA radiocommunication system including first and second cells adjacent one another, said system comprising:

first and second base stations disposed in said first and second cells, respectively;

a first set and a second set of TDMA radio channels for usage by said first and second base stations, respectively, said first and second sets including substantially the same channels, said channels including timeslots organized into frames;

a first transmitter, in said first base station, which transmits signals on up to a maximum number of said timeslots in each frame, said maximum number being less than a total number of available timeslots assigned to said first set of radio channels; and a second transmitter, in said second base station, which transmits signals on up to said maximum number of said timeslots in each frame.

4. The system of claim 3, wherein said maximum number of timeslots is equal to 60 percent of the available timeslots assigned to said first set of channels.

5. A method for transmitting radio signals associated with connections in a time division multiple access (TDMA) radiocommunication system comprising the steps of:

providing first and second cells adjacent one another, each cell having respective first and second base stations;

allocating a first set and second set of TDMA radio channels for usage by said first and second base stations, respectively, said first and second sets simultaneously including substantially the same channels;

transmitting radio signals from a transmitter to remote stations in said first and second cells using said first and second sets of radio channels, respectively; and limiting an average number of simultaneous connections in said first and second cells to be substantially less than an average number of timeslots on said radio channels in said first and second sets, respectively.

6. The method of claim 5, wherein said average number of simultaneous connections is approximately 60 percent of said average number timeslots on said radio channels.

7. The method of claim 5, wherein said first and second sets of radio channels can simultaneously be substantially the same channels by providing that said step of transmitting further comprises the step of:

hopping among said channels in said first and second sets of channels in a non-coinciding manner.

8. The method of claim 7, further comprising the step of:

transmitting hopping information from said first and second base stations to said remote stations in said first and second cells.

9. A radiocommunication system including first and second cells adjacent one another, said system comprising:

a first set and second set of TDMA radio channels for usage by said first and second base stations, respectively, said first and second sets simultaneously including substantially the same channels;

first and second transmitters for transmitting signals to remote stations in said first and second cells using said first and second sets of radio channels, respectively; and means for limiting an average number of simultaneous connections in said first and second cells to be substantially less than an average number of timeslots on said radio channels in said first and second sets, respectively.

10. The system of claim 9, wherein said average number of simultaneous connections is approximately 60 percent of said average number timeslots on said radio channels.

11. The system of claim 9, wherein said first and second sets of radio channels can simultaneously be substantially the same channels and said system further comprises:

means for hopping among said channels in said first and second sets of channels in a non-coinciding manner.

12. The system of claim 11, wherein said transmitters also transmit hopping information to said remote stations in said first and second cells.

13. A method for transmitting radio signals in a time division multiple access (TDMA) radiocommunication system comprising the steps of:

providing first and second cells adjacent one another, each cell having respective first and second base stations;

allocating a first set and second set of TDMA radio channels for usage by said first and second base stations, respectively, said first and second sets including substantially the same channels;

estimating signal-to-interference ratios for signals received from mobile stations in the first cell in said first base station and the second cell in said second base station;

comparing the estimated signal-to-interference ratios with a desired signal-to-interference ratio;

identifying one of said TDMA radio channels in said first set which is currently unused in the first cell; and establishing one or more connections between said mobile stations and one of said first base station and said second base station using said one of said TDMA radio channels in said first set if said estimated signal-to-interference ratios based upon mobile stations in at least one of said first and second cells exceed the desired signal-to-interference ratio.

14. The method of claim 13, wherein said step of establishing further comprises the step of:

establishing said connection if said estimated signal-to-interference ratios from mobile stations in said first cell exceed the desired signal-to-interference ratio.

15. The method of claim 13, wherein said step of establishing further comprises the step of:

establishing said connection if said estimated signal-to-interference ratios from mobile stations in both said first cell and said second cell exceed the desired signal-to-interference ratio.

16. The method of claim 13, wherein said step of establishing further comprises the step of:

establishing said connection if said estimated signal-to-interference ratios from mobile stations in said first cell, said second cell and any other cell adjacent to said first cell exceed the desired signal-to-interference ratio.

17. The method of claim 13, further comprising the steps of:

hopping connections in said first cell from one channel in said first set to another channel in said first set according to predetermined hopping sequences;

identifying a hopping sequence which hops to channels in said first set free of coincidence from other hopping sequences which are already in use in said first cell; and assigning said hopping sequence to said established connection.

18. A time division multiple access (TDMA) radiocommunication system comprising:

first and second cells adjacent one another, each cell having respective first and second base stations;

a first set and second set of TDMA radio channels for usage by said first and second base stations, respectively, said first and second sets including substantially the same channels;

means, disposed in said first and second base stations, for estimating signal-to-interference ratios for signals received from mobile stations in the first cell and in the second cell, respectively;

means for comparing the estimated signal-to-interference ratios with a desired signal-to-interference ratio;

means for establishing one or more connections between said mobile stations and one of said first base station and said second base station using a currently unused one of said TDMA radio channels in said first set if estimated signal-to-interference ratios based upon certain mobile stations exceed said desired signal-to-interference ratio.

19. The system of claim 18, wherein said certain mobile stations comprise mobile stations in said first cell.

20. The system of claim 18, wherein said certain mobile stations comprise mobile stations in both said first cell and said second cell.

21. The system of claim 18, wherein said certain mobile stations comprise mobile stations in said first cell, said second cell and any other cell adjacent to said first cell.

22. The system of claim 18, further comprising:

means for hopping connections in said first cell from one channel in said first set to another channel in said first set according to predetermined hopping sequences;

means for identifying a hopping sequence which hops to channels in said first set free of coincidence from other hopping sequences which are already in use in said first cell; and means for assigning said hopping sequence to said established connection.

* * * * *